(12) United States Patent
Kaynardag et al.

(10) Patent No.: US 11,879,814 B2
(45) Date of Patent: Jan. 23, 2024

(54) MOBILE RAILWAY TRACK DEFECT DETECTION

(71) Applicant: Board of Regents, The University of Texas System, Austin, TX (US)

(72) Inventors: Korkut Kaynardag, Austin, TX (US); Salvatore Salamone, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 466 days.

(21) Appl. No.: 16/647,189

(22) PCT Filed: Sep. 18, 2018

(86) PCT No.: PCT/US2018/051535
§ 371 (c)(1),
(2) Date: Mar. 13, 2020

(87) PCT Pub. No.: WO2019/055994
PCT Pub. Date: Mar. 21, 2019

(65) Prior Publication Data
US 2020/0271543 A1    Aug. 27, 2020

Related U.S. Application Data

(60) Provisional application No. 62/559,726, filed on Sep. 18, 2017.

(51) Int. Cl.
*G01M 5/00* (2006.01)
*G01N 29/04* (2006.01)
(Continued)

(52) U.S. Cl.
CPC ........ *G01M 5/0066* (2013.01); *G01M 5/0025* (2013.01); *G01M 5/0075* (2013.01);
(Continued)

(58) Field of Classification Search
CPC ............. G01M 5/0066; G01M 5/0025; G01M 5/0075; G01M 17/03; G01M 7/08;
(Continued)

(56) References Cited

U.S. PATENT DOCUMENTS

| | | | |
|---|---|---|---|
| 4,843,885 A | 7/1989 | Bambara | |
| 7,089,796 B2 * | 8/2006 | Pepper | G01H 9/00 600/407 |

(Continued)

FOREIGN PATENT DOCUMENTS

| | | | | |
|---|---|---|---|---|
| CA | 2847375 A1 * | 3/2013 | ............ | B61L 23/044 |
| KR | 20140074312 | * 6/2014 | ............ | B61L 23/042 |
| KR | 101962992 B1 * | 3/2019 | ............ | B61L 23/048 |

OTHER PUBLICATIONS

International Search Report and the Written Opinion of the International Searching Authority, or Declaration to International application No. PCT/US2018/051535 filed Sep. 18, 2018, dated Nov. 19, 2018, 16 pages.

(Continued)

*Primary Examiner* — Jacques M Saint Surin
(74) *Attorney, Agent, or Firm* — Meunier Carlin & Curfman LLC

(57) ABSTRACT

A railway track defect detection system may include a mobile defect detection platform and a modal parameter analyzer. The platform may include an excitation mechanism (e.g., an excitation hammer or wheels that are in contact with a railway track) to apply multiple impact forces to the railway track while the platform travels along the railway track, and a laser Doppler vibrometer to capture, while the platform travels along the railway track, vibration data representing vibrations of the railway track caused by application of the multiple impact forces by the excitation mechanism. The modal parameter analyzer may be configured to detect, based on the vibration data captured by the (Continued)

laser Doppler vibrometer, a defect in the railway track. For example, changes in vibration amplitudes, mode shapes, damping ratios, or a natural frequency derived from the received vibration data may indicate the presence of a defect in the railway track.

20 Claims, 17 Drawing Sheets

(51) Int. Cl.
    *G01N 29/24*     (2006.01)
    *G01N 29/44*     (2006.01)
    *G01N 29/42*     (2006.01)

(52) U.S. Cl.
    CPC ....... *G01N 29/045* (2013.01); *G01N 29/2418* (2013.01); *G01N 29/4445* (2013.01); *G01N 29/42* (2013.01); *G01N 2291/2623* (2013.01)

(58) Field of Classification Search
    CPC .............. G01N 29/2418; G01N 29/045; G01N 29/4445; G01N 29/46; G01N 2291/2623; G01N 29/42; G01H 9/00
    USPC ........................................................ 73/579
    See application file for complete search history.

(56) References Cited

U.S. PATENT DOCUMENTS

| | | | |
|---|---|---|---|
| 8,577,628 B2 * | 11/2013 | Caicedo | G01V 1/003 |
| | | | 702/56 |
| 9,291,604 B2 * | 3/2016 | Kajiwara | G01M 7/00 |
| 9,731,734 B2 * | 8/2017 | Li | B61L 23/042 |
| 9,752,993 B1 * | 9/2017 | Thompson | G01N 25/72 |
| 10,444,202 B2 * | 10/2019 | Flynn | G01N 29/12 |
| 10,641,898 B1 * | 5/2020 | Moreu Alonso | G01S 17/50 |
| 10,677,716 B1 * | 6/2020 | Hart | G01S 17/50 |
| 2007/0163352 A1 | 7/2007 | Nielsen et al. | |
| 2008/0304065 A1 | 12/2008 | Hesser et al. | |
| 2015/0291192 A1 | 10/2015 | Li et al. | |
| 2021/0291882 A1 * | 9/2021 | Snyder | B61L 1/02 |
| 2021/0339758 A1 * | 11/2021 | Laperle | G07C 5/0808 |

OTHER PUBLICATIONS

International Preliminary Report on Patentability for PCT Patent Application No. PCT/US2018/051535, dated Apr. 2, 2020; 9 pages.

\* cited by examiner

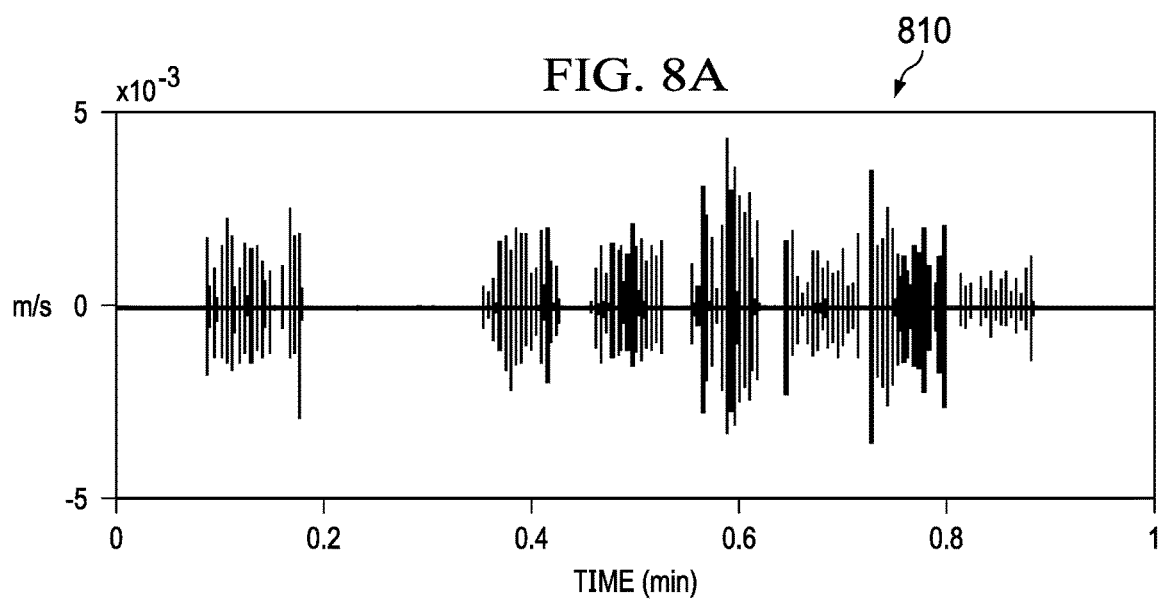
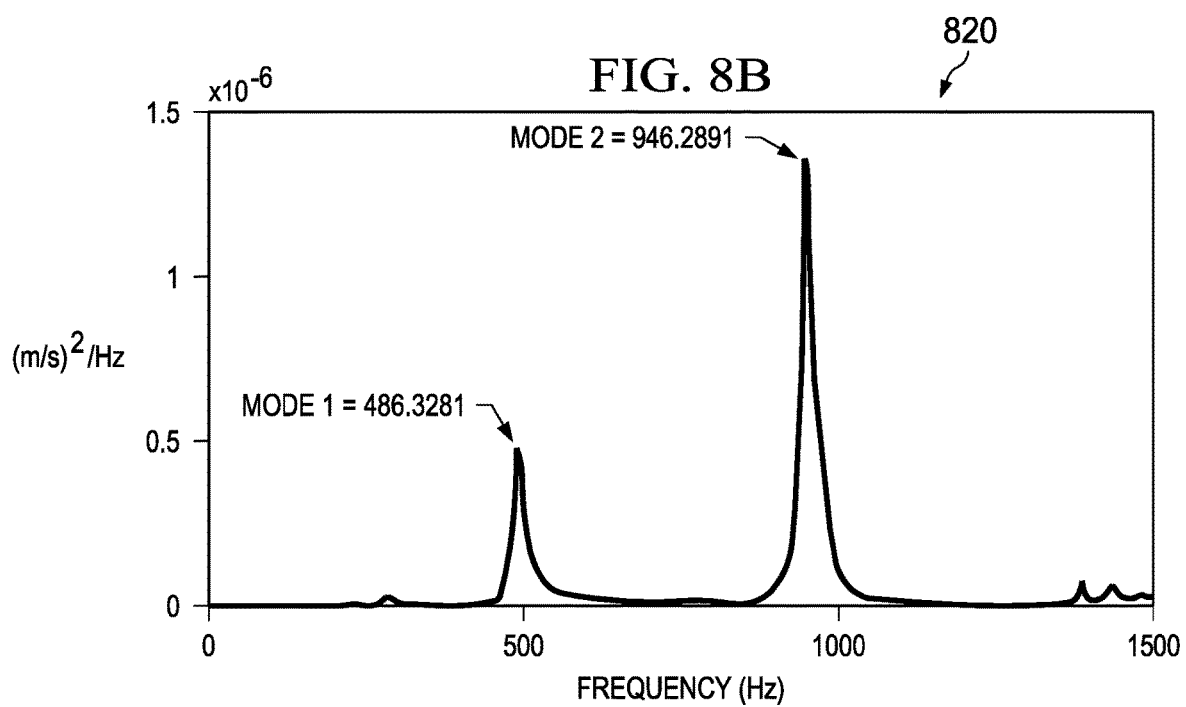

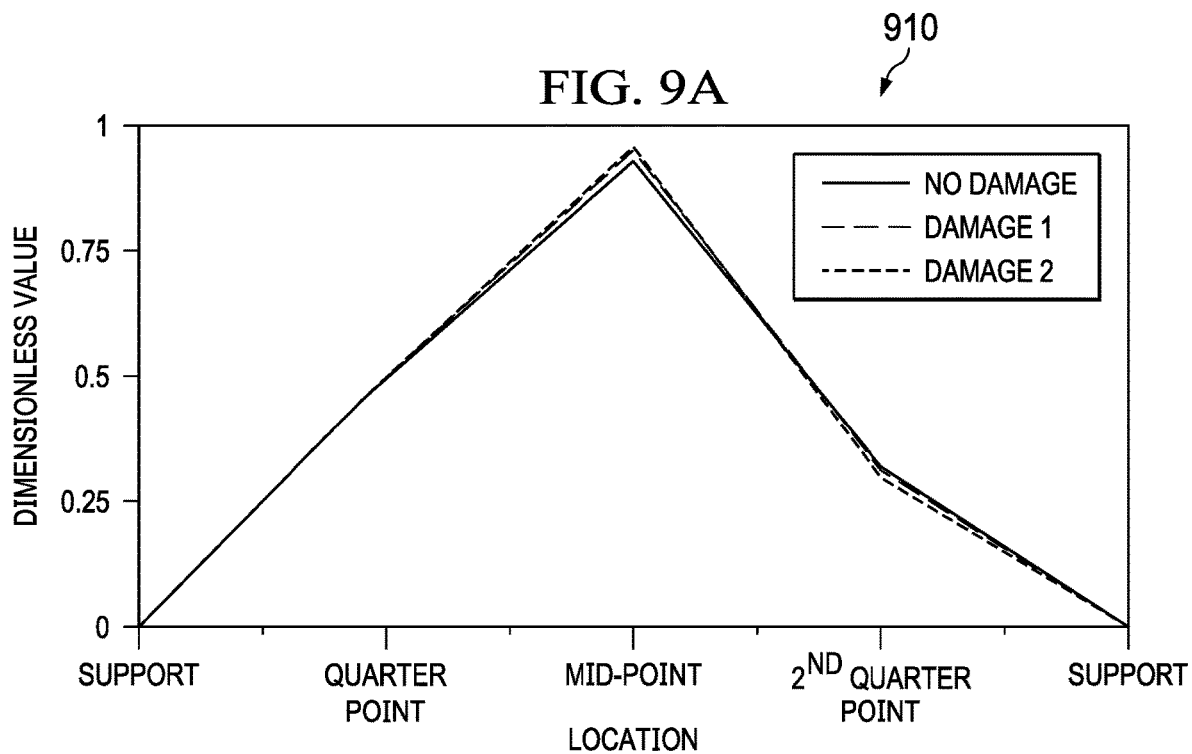
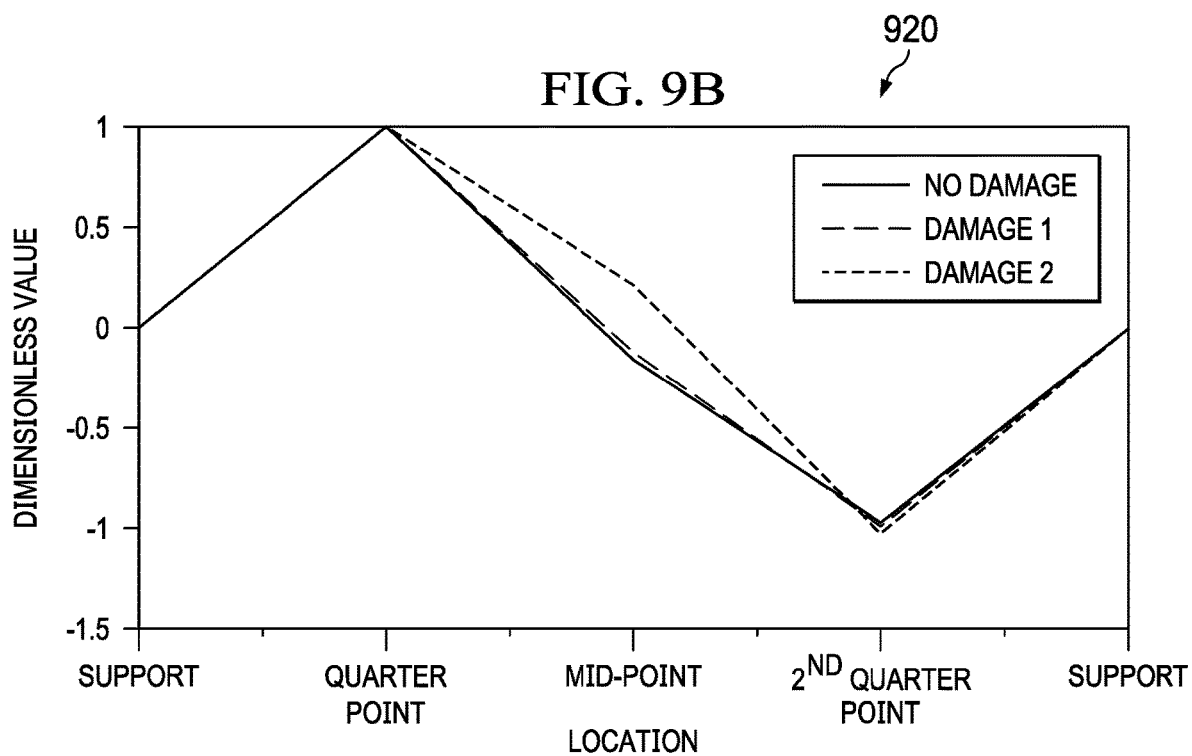

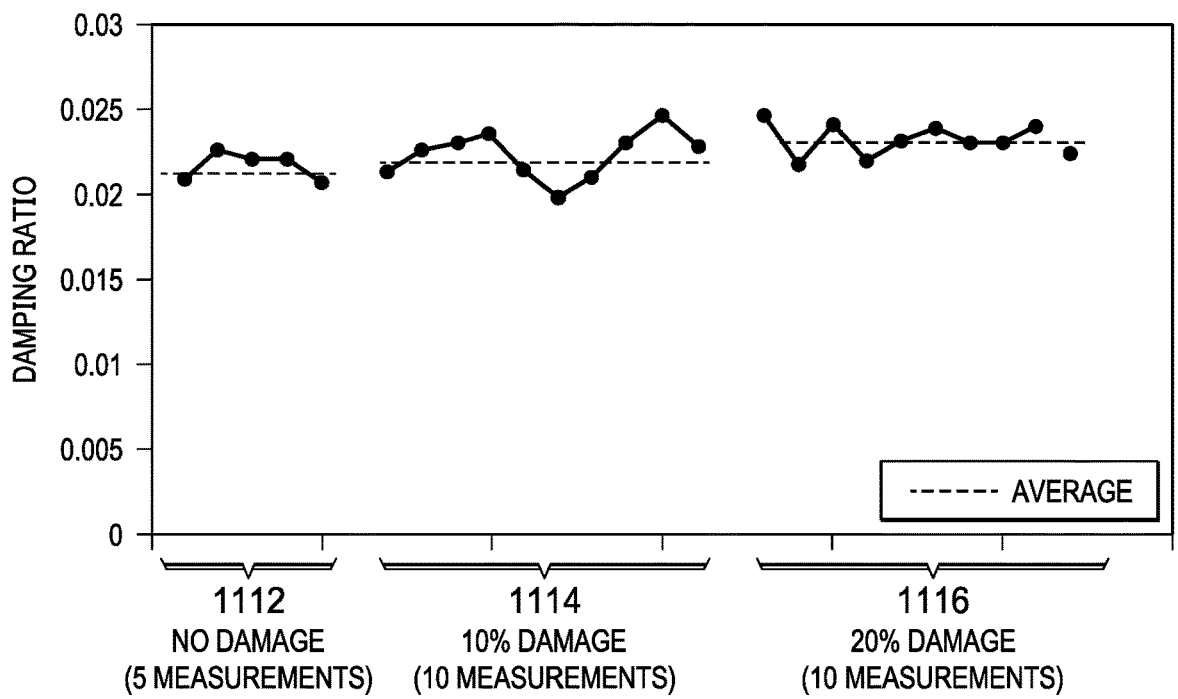

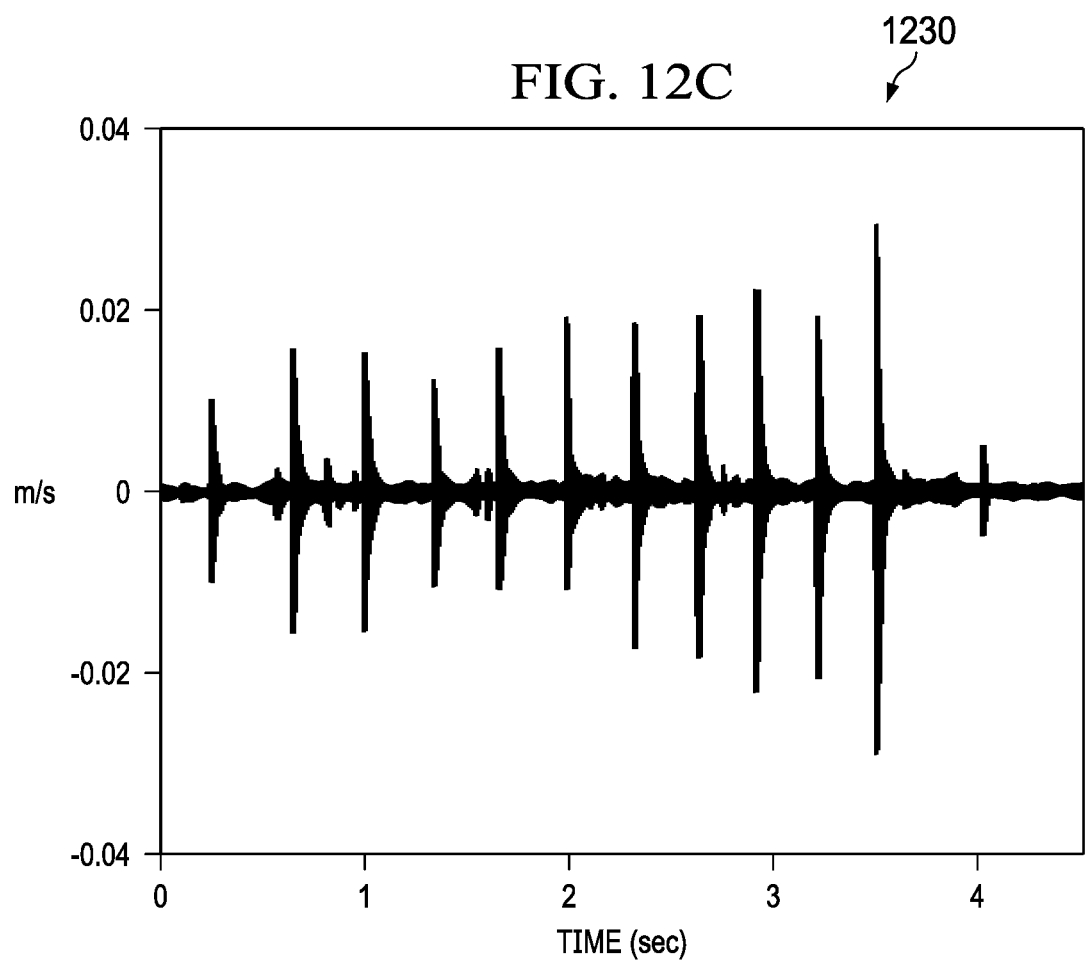

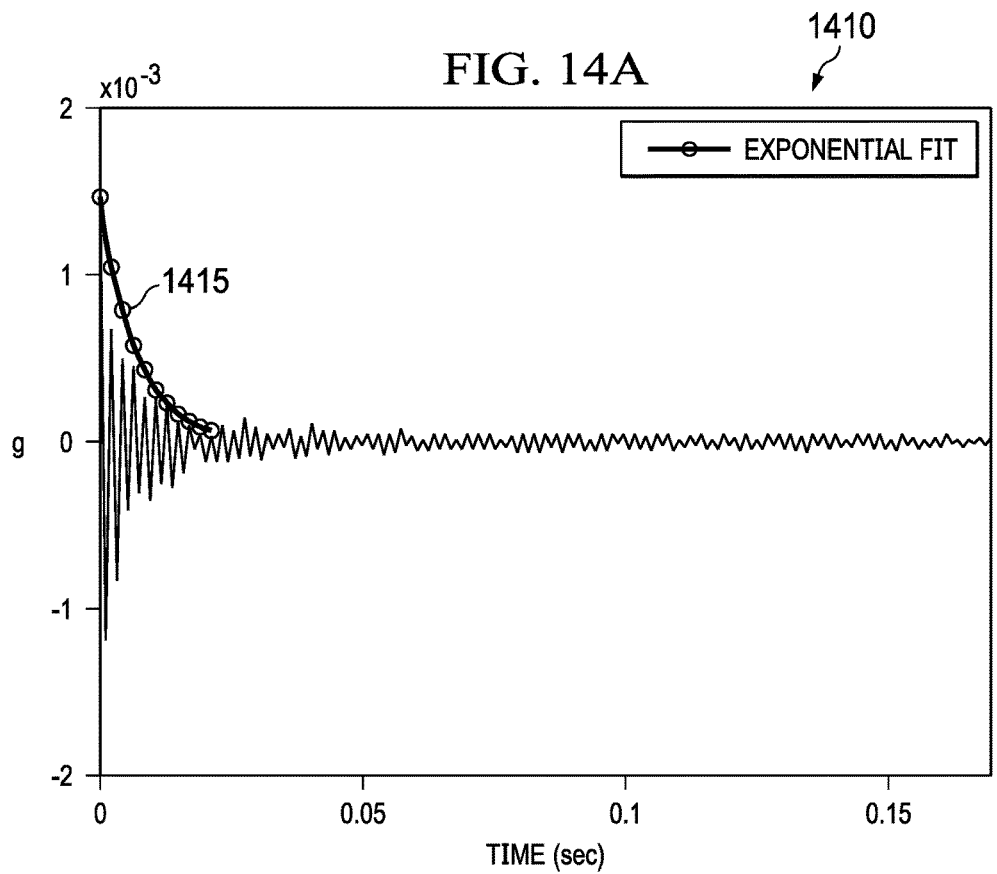
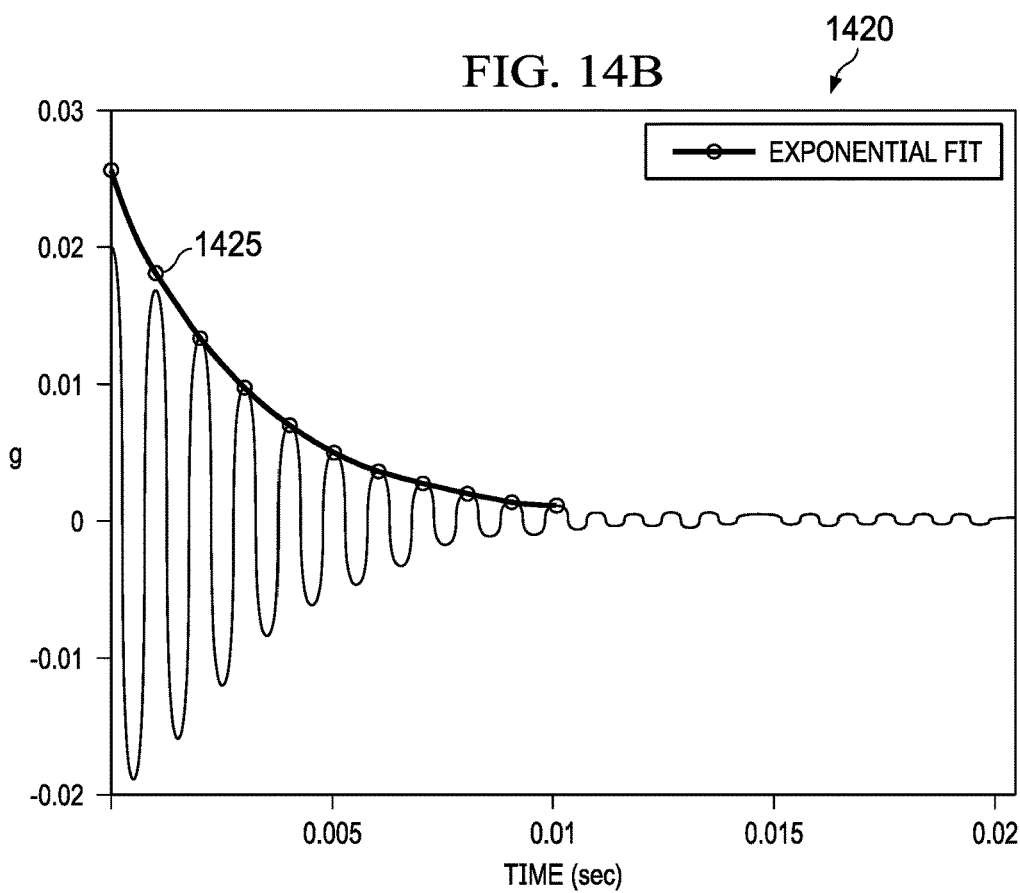

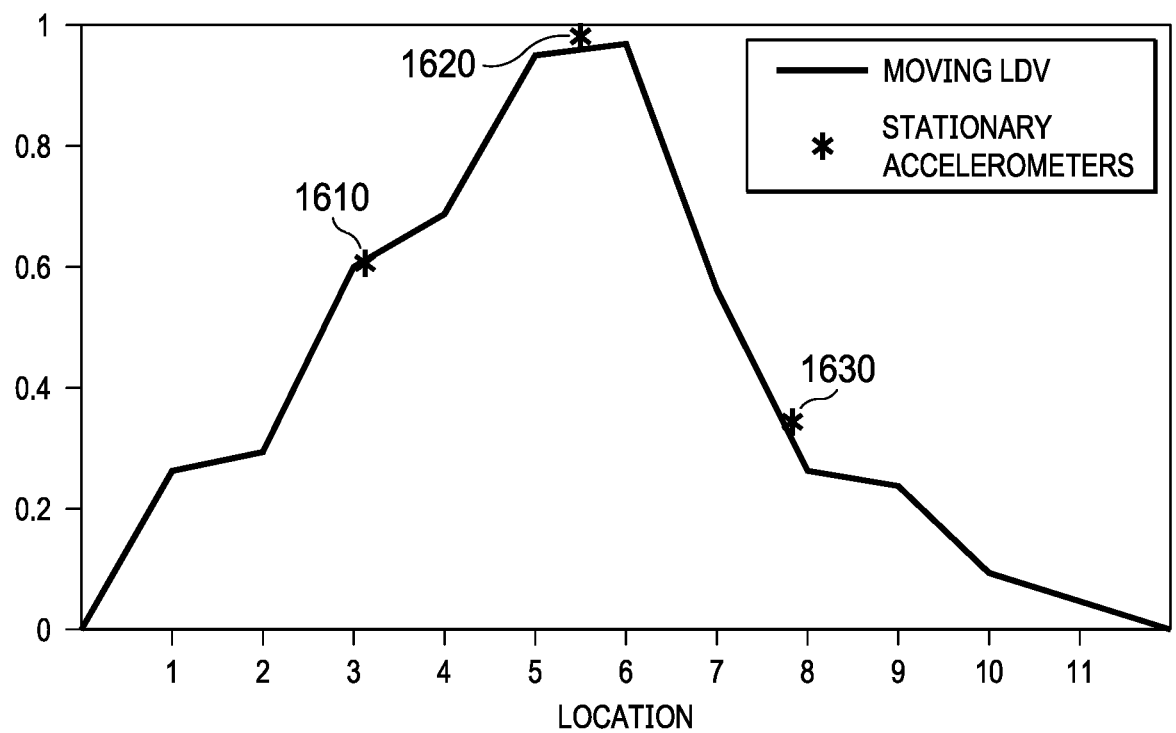

MOBILE RAILWAY TRACK DEFECT DETECTION

This application is a U.S. National Stage Filing under 35 U.S.C. § 371 of International Patent Application Serial No. PCT/US2018/051535 filed Sep. 18, 2018, which claims priority to U.S. Provisional Application No. 62/559,726 filed Sep. 18, 2017, entitled "Mobile Railway Track Defect Detection," which is incorporated herein by reference in its entirety.

FIELD OF THE DISCLOSURE

The present disclosure relates generally to systems and methods for detecting defects in railway tracks and, more specifically, to detecting internal cracks in railway tracks using moving laser sensors.

DESCRIPTION OF THE RELATED ART

The benefits of railway transportation for improving economies and urban development is understood by many countries. Railway transportation plays a key role in the mass transportation of products and passengers. Consequently, human lives and the economies of many countries strongly depend on the availability of safe and efficient railway transportation. For this reason, government transportation agencies and railway companies put significant effort into systems and methods to ensure safety and the uninterrupted operation of railways. Faulty railway tracks can endanger human lives and deteriorate service. One of the most significant types of faults that can occur is an internal crack located in a track head. These types of cracks can be caused by inherent manufacturing processes, cyclic loading, impact from rolling stock, rail flow, and wheel contact stress, for example.

Currently, ultrasonic measurement techniques are used to detect defects in railway tracks. For example, guided waves and ultrasound based nondestructive (NDT) methods have been extensively studied to find the railway defects including crack type damages, including methods that include a hybrid analytical-Finite Element Method (FEM) technique or a Semi Analytical FEM, eddy current testing, and a pitch-catch low frequency ultrasonic technique. However, current ultrasonic damage detection methods for railway tracks are likely to be insufficient to detect internal cracks in a railway track head. For example, these ultrasonic methods are based on the propagation of waves within the material. Any artificial crack, however small, located on the surface close to a critical internal crack can affect the reflection of ultrasound waves. For example, when an artificial crack is located above a critical internal crack, the artificial crack can prevent the ultrasonic waves from reaching the critical internal crack.

Studies using vibration based methods to detect railway track damages have focused on detection of rail irregularities or broken fasteners and sleepers. For example, a bogie-mounted gyroscope was used to obtain mean vertical alignments of tracks. Arrays of accelerometers and displacement transducers have been adopted to monitor vertical irregularity in track geometry, and some have proposed placing these sensors on the vehicle itself. However, the detection of internal cracks in track heads using vibration based damage detection methods has not been addressed.

SUMMARY

The disclosure relates to systems and methods for detecting defects in railway tracks. In one aspect, a disclosed system may include a mobile defect detection platform and a modal parameter analyzer. The mobile defect detection platform may include an excitation mechanism to apply multiple impact forces to a railway track while the mobile defect detection platform travels along a railway track, and a laser Doppler vibrometer to capture, while the mobile defect detection platform travels along the railway track, vibration data representing vibrations of the railway track caused by application of the multiple impact forces by the excitation mechanism. The modal parameter analyzer may be configured to detect, based at least in part on the vibration data captured by the laser Doppler vibrometer, a defect in the railway track.

In any of the disclosed embodiments, the system may further include an accelerometer coupled to the laser Doppler vibrometer to measure the vibration of the laser Doppler vibrometer while the mobile defect detection platform travels along the railway track. To detect the defect, the modal parameter analyzer may be configured to subtract the vibration of the laser Doppler vibrometer measured by the accelerometer from the vibration data captured by the laser Doppler vibrometer.

In any of the disclosed embodiments, the excitation mechanism may include a plurality of wheels mounted on the mobile defect detection platform, the wheels being in contact with the railway track as the mobile defect detection platform travels along the railway track.

In any of the disclosed embodiments, to detect the defect, the modal parameter analyzer may be configured to, for each of the multiple impact forces applied by the excitation mechanism, determine the magnitude of the impact force and normalize the vibration data corresponding to the impact force based on the determined magnitude.

In any of the disclosed embodiments, to capture the vibration data, the laser Doppler vibrometer may be configured to sample laser beams reflected off the railway track at a predetermined constant frequency, the predetermined constant frequency being dependent on the vibration frequency of the railway track.

In any of the disclosed embodiments, to detect the defect, the modal parameter analyzer may be configured to determine a value of a modal parameter for each of a plurality of vibration data samples, and to detect a change in the value of the modal parameter indicative of a defect in the railway track.

In any of the disclosed embodiments, the modal parameter analyzer may include an input/output interface coupled to the laser Doppler vibrometer to receive at least a portion of the vibration data captured by the laser Doppler vibrometer, a processor, and a memory. The memory may store program instructions that when executed by the processor cause the processor to determine, based on the received vibration data, that vibration amplitudes, mode shapes, damping ratios, or a natural frequency derived from the received vibration data are indicative of the presence of a defect in the railway track.

In any of the disclosed embodiments, the speed at which the mobile defect detection platform travels along the railway track may be controlled by a predetermined speed parameter value, the predetermined speed parameter value being dependent on the vibration frequency of the railway track.

Another a disclosed aspect includes a method for detecting defects in railway tracks. The method may include applying, by an excitation mechanism of a mobile defect detection platform to a railway track as the mobile defect detection platform travels along the railway track, multiple impact forces, capturing, by a laser Doppler vibrometer of the mobile defect detection platform while the mobile defect detection platform travels along the railway track, vibration data representing vibrations of the railway track caused by application of the multiple impact forces by the excitation mechanism, and detecting, based at least in part on the vibration data captured by the laser Doppler vibrometer, a defect in the railway track.

In any of the disclosed embodiments, the method may further include measuring, by an accelerometer coupled to the laser Doppler vibrometer, the vibration of the laser Doppler vibrometer while the mobile defect detection platform travels along the railway track. Detecting the defect may include subtracting the vibration of the laser Doppler vibrometer measured by the accelerometer from the vibration data captured by the laser Doppler vibrometer.

In any of the disclosed embodiments, the excitation mechanism may include a plurality of wheels mounted on the mobile defect detection platform, the wheels being in contact with the railway track as the mobile defect detection platform travels along the railway track.

In any of the disclosed embodiments, detecting the defect may include, for each of the multiple impact forces applied by the excitation mechanism, determining the magnitude of the impact force and normalizing the vibration data corresponding to the impact force based on the determined magnitude.

In any of the disclosed embodiments, capturing the vibration data may include sampling laser beams reflected off the railway track at a predetermined constant frequency, the predetermined constant frequency being dependent on the vibration frequency of the railway track.

In any of the disclosed embodiments, detecting the defect may include determining a value of a modal parameter for each of a plurality of vibration data samples and detecting a change in the value of the modal parameter indicative of a defect in the railway track.

In any of the disclosed embodiments, the speed at which the mobile defect detection platform travels along the railway track may be controlled by a predetermined speed parameter value, the predetermined speed parameter value being dependent on the vibration frequency of the railway track In yet another aspect, a disclosed mobile defect detection platform may include an excitation mechanism to apply multiple impact forces to a target structure while the mobile defect detection platform travels parallel to a face of the target structure, a laser Doppler vibrometer to capture, while the mobile defect detection platform travels parallel to the face of the target structure, vibration data representing vibrations of the target structure caused by application of the multiple impact forces by the excitation mechanism, and an input/output interface coupled to a modal parameter analyzer to communicate at least a portion of the vibration data captured by the laser Doppler vibrometer to the modal parameter analyzer.

In any of the disclosed embodiments, the mobile defect detection platform may further include an accelerometer coupled to the laser Doppler vibrometer to measure the vibration of the laser Doppler vibrometer while the mobile defect detection platform travels parallel to the face of the target structure.

In any of the disclosed embodiments, the excitation mechanism may include a plurality of wheels mounted on the mobile defect detection platform, the wheels being in contact with the target structure as the mobile defect detection platform travels parallel to the face of the target structure.

In any of the disclosed embodiments, to capture the vibration data, the laser Doppler vibrometer may be configured to sample laser beams reflected off the face of the target structure at a predetermined constant frequency, the predetermined constant frequency being dependent on the vibration frequency of the target structure.

In any of the disclosed embodiments, the speed at which the mobile defect detection platform travels parallel to the face of the target structure may be controlled by a predetermined speed parameter value, the predetermined speed parameter value being dependent on the vibration frequency of the target structure.

BRIEF DESCRIPTION OF THE DRAWINGS

Embodiments of the present disclosure may be better understood through reference to the following figures in which:

FIGS. 8A and 8B depict graphs based on data recorded by an accelerometer in the test setup shown in FIGS. 5A-5D;

FIGS. 9A and 9B depict graphs of mode shapes based on data recorded by an accelerometer in the test setup shown in FIGS. 5A-5D;

FIGS. 11A and 11B depict graphs of damping ratios based on data recorded by an accelerometer in the test setup shown in FIGS. 5A-5D;

FIG. 12C is a graph of velocity data recorded by a moving laser Doppler vibrometer and then bandpass filtered;

FIGS. 14A and 14B depict graphs of impulse response functions in a first mode based on data recorded by an accelerometer and by a moving laser Doppler vibrometer, respectively;

FIG. 16 is a graph illustrating a comparison of a first mode shape based on data recorded by an accelerometer and a first mode shape based on data recorded by a moving laser Doppler vibrometer.

DETAILED DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments. For a more complete understanding of the present disclosure, reference is made to the following description and accompanying drawings.

As noted above, current ultrasonic damage detection methods for railway tracks are likely to be insufficient to detect internal cracks in a railway track head. For example, when an artificial crack is located above a critical internal crack, the artificial crack can prevent the ultrasonic waves from reaching the critical internal crack. As described in detail herein, vibration measurements recorded from the surface of railway tracks, rather than ultrasonic measurements, may be used to detect internal cracks in railway tracks. The quality of these measurements is not affected by artificial cracks. In various embodiments of the mobile railway track defect detection systems described herein, vibration measurements alone may be used to detect railway track defects, or vibration measurements may be combined with ultrasonic measurements to detect railway track defects.

The mobile railway track defect detection platforms described herein may use moving laser sensors to measure dynamic vibrations of railway tracks as the platforms travel along the railway tracks. For example, one or multiple non-contact Laser Doppler Vibrometers (LDVs) may be placed on a moving platform (such a railway locomotive) to measure the dynamic response of railway tracks. Dynamic response measurements obtained from the LDVs, such as dynamic vibration amplitudes, mode shapes, damping ratios, and natural frequency may be used in the identification and evaluation of rail defects, including internal flaws. Modal parameters of the tracks may be obtained using these moving non-contact laser sensors, providing a rapid assessment of a large structure with only one or a few such sensors.

Laboratory tests have demonstrated that an internal crack in a railway track causes changes in the dynamic response parameters of the track. By observing these changes, the location of damage may be detected. For example, a modal parameter analyzer may detect internal crack type faults in a railway track based on measured modal parameters, on characteristic dynamic vibrations of the railway track, and on the effects of internal crack type faults on the dynamic properties of the railway track.

Figure 1:
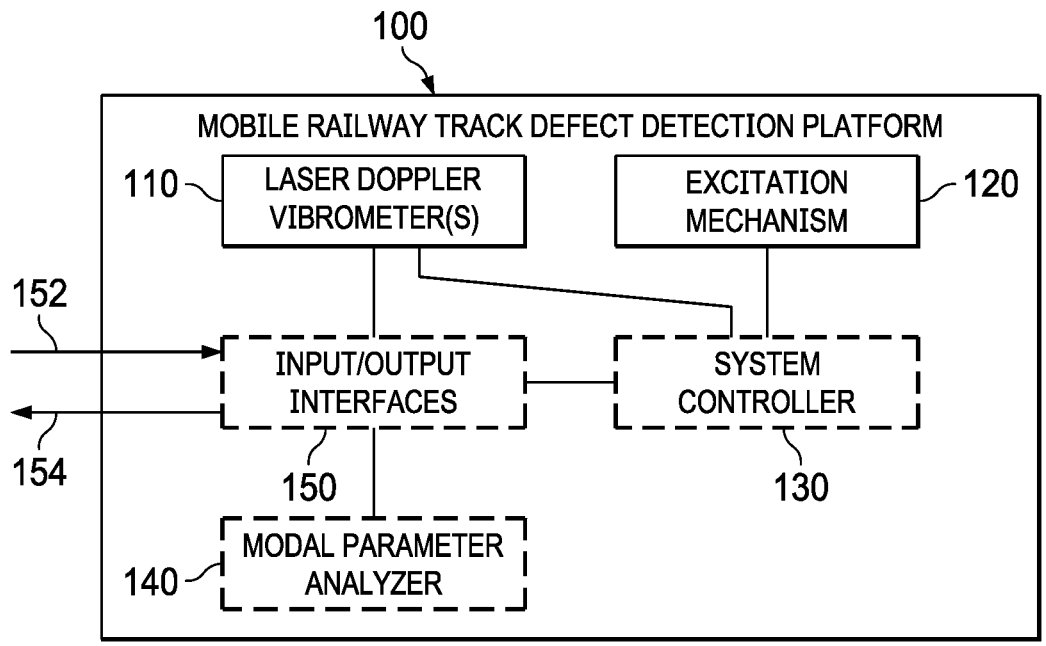
FIG. 1 is a block diagram illustrating selected elements of a mobile railway track defect detection platform, according to one embodiment.

FIG. 1 is a block diagram illustrating selected elements of an example mobile railway track defect detection platform, according to one embodiment. As illustrated in this example, mobile defect detection platform 100 includes one or more laser Doppler vibrometers 110, an excitation mechanism 120, one or more input/output interfaces 150, a system controller 130, and a modal parameter analyzer 140. In some embodiments, the excitation mechanism may include an external force excitation system, such as an excitation hammer that is mounted on mobile defect detection platform 100 and that comes in contact with the railway track as a series of discrete impact forces. In some embodiments, wheels mounted on mobile defect detection platform 100 may serve as the excitation mechanism for the platform, generating vibrations in the railway track as the platform travels along the railway track. When the impact excitation is implemented by one or more wheels, the impact forces may be applied as a controlled impact excitation by the wheels (which might or might not be periodic) or through the natural contact forces/excitation between wheels and tracks. The type of excitation mechanism used may affect the speed at which the mobile defect detection platform 100 travels on the railway track, the frequency at which impact forces are applied and/or the frequency at which vibration data is sampled, in various embodiments. One or more of the elements of platform 100 shown in dashed lines may reside separately from platform 100 and may be coupled to platform 100, rather than residing on platform 100 itself.

A laser Doppler vibrometer (LDV) is a scientific instrument that is used to make non-contact vibration measurements of a surface of interest. In a typical LDV, a laser beam may be divided into a reference beam and a test beam by a beamsplitter. A frequency shifted version of the test beam is directed at the surface of interest. A portion of the light scattered from the surface of interest is collected by the LDV and reflected by the beamsplitter to a photodetector, where it is combined with the reference beam. The vibration amplitude and frequency are extracted from the Doppler shift of the reflected laser beam frequency due to the motion (vibration) of the surface. The output of an LDV is generally a continuous analog voltage that is directly proportional to the target velocity component along the direction of the laser beam. In the mobile railway track defect detection systems described herein, to capture the vibration data, a laser Doppler vibrometer 110 is configured to sample laser beams reflected off the railway track at a predetermined constant frequency.

Inputs to system 100 are shown as controls 152. Controls 152 may include, but are not limited to, a speed control parameter value used to control the speed at which platform 100 travels along a railway track and/or a sampling frequency value used to control the frequency with which vibration measurements are recorded and sampled by laser Doppler vibrometers 110. Outputs from system 100 are shown as data/results 154. Data/results 154 may include, but are not limited to, vibration data recorded by laser Doppler vibrometers 110 (which may include dynamic vibration amplitudes), modal parameter values (which may include mode shape identification data and/or damping ratios), and/or defect reports.

System controller 130 may, based on a received sampling frequency value, control the frequency at which laser Doppler vibrometers 110 sample vibration data and/or the timing of the impact forces applied by excitation mechanism. The sampling frequency value may be dependent on (and may be limited by) the vibration frequency of the railway track. System controller 130 may control the speed at which the platform travels along a railway track and, thus, the timing of the excitation of the railway track by the impact of the platform wheels on the railway track based on a received speed control parameter value. The speed control parameter value may be dependent on (and may be limited by) the vibration frequency of the railway track. In some embodiments, the functions described as being implemented by system controller 130 may be distributed among different elements of platform 100 or a mobile railway track defect detection system that includes platform 100.

Modal parameter analyzer 140 may be configured to detect, based at least in part on the vibration data captured by laser Doppler vibrometer(s) 110, a defect in the railway track. In one example, the modal parameter analyzer may be configured to determine a value of a modal parameter for each of multiple vibration data samples obtained by laser Doppler vibrometer(s) 110 and detect a change in the value of the modal parameter indicative of a defect in the railway track. In at least some embodiments, modal parameter analyzer 140 may include an input/output interface coupled to the laser Doppler vibrometer to receive at least a portion of the vibration data captured by the laser Doppler vibrometer, a processor, and a memory storing program instructions executable to determine, based on the received vibration data, that vibration amplitudes, mode shapes, damping ratios, or a natural frequency derived from the received vibration data are indicative of the presence of a defect in the railway track.

Platform 100 may include an accelerometer coupled to the laser Doppler vibrometer to measure the vibration of the laser Doppler vibrometer while mobile defect detection platform 100 travels along the railway track and, to detect a defect in the railway track, modal parameter analyzer 140 may be configured to subtract the vibration of the laser Doppler vibrometer measured by the accelerometer from the vibration data captured by the laser Doppler vibrometer. Modal parameter analyzer 140 may be configured to, for each of the multiple impact forces applied by the excitation mechanism, determine the magnitude of the impact force, and normalize the vibration data corresponding to the impact force based on the determined magnitude.

Figure 2:
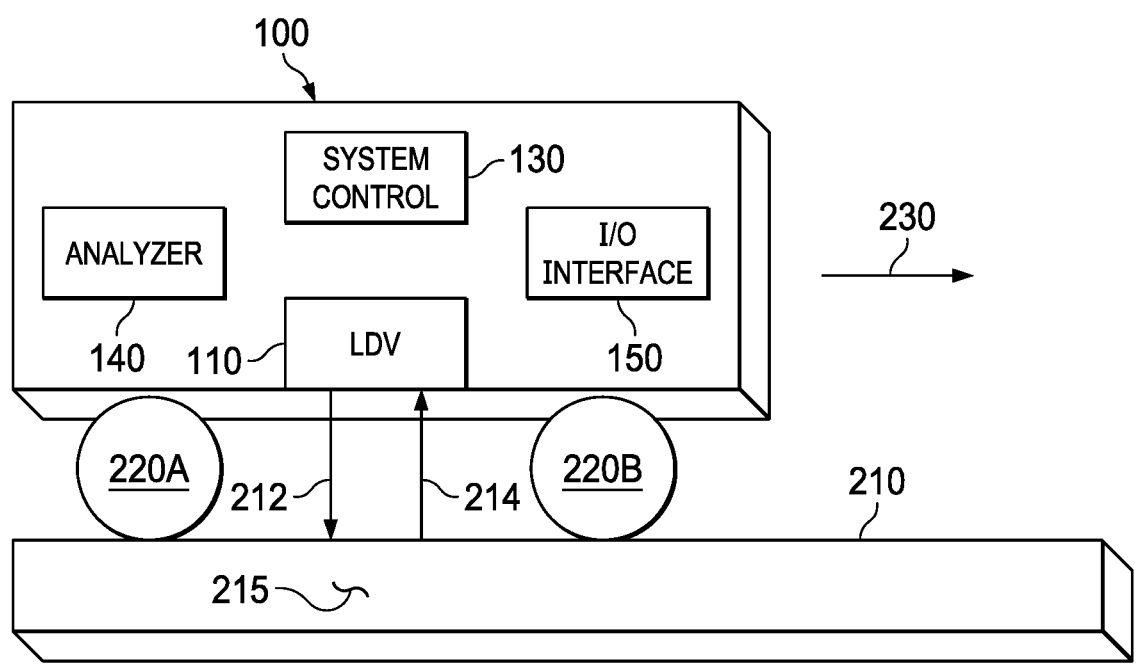
FIG. 2 is a block diagram illustrating selected elements of mobile railway track defect detection platform while in use, according to at least one embodiment.

FIG. 2 is a block diagram illustrating selected elements of mobile railway track defect detection platform 100 while in use, according to at least one embodiment. In this example, platform 100 includes laser Doppler vibrometer 110, system controller 130, modal parameter analyzer 140, and input/output interfaces 150, all of which may be similar to the corresponding elements of FIG. 1 described above. Platform 100 also includes multiple wheels 220 that are in contact with railway track 210, including wheels 220A and 220B. As indicated by arrow 230, mobile railway track defect detection platform 100 is traveling to the right along a portion of railway track 210 that includes an internal crack 215. The speed at which platform 100 travels along railway track 210 may be controlled by a speed control parameter value, which may be dependent on (and may be limited by) the vibration frequency of railway track 210. In one example embodiment in which there is not an external force excitation mechanism, the speed control parameter value may limit the speed at which platform 100 travels along railway track 210 to a value between 40 and 50 mph. At this speed, platform 100 may be able to operate using a corresponding frequency of the excitation of the railway track and the sampling of vibration data and obtain good defect detection results (e.g., few false positives or negatives). For example, when platform 100 travels too fast, it may be difficult for laser Doppler vibrometer 110 to keep up with the amount of vibration data generated due to the frequency of the impact forces applied by the excitation mechanism (in this case, wheels 220). In embodiments that include an external force excitation system, speeds higher than 40 to 50 mph may be possible, with harmonic forces of very high frequencies, While mobile railway track defect detection platform 100 travels along railway track 210, Doppler vibrometer 110 directs laser beam 212 to the top side of railway track 210 and samples laser beams 214 that are reflected back off railway track 210 to obtain vibration data representing vibrations of railway track 210 caused by application of the multiple impact forces by wheels 220 on railway track 210. Modal analyzer 140 may detect the presence of internal crack 215, and determine its location, based on the recorded vibration data, as described herein.

While the mobile railway track defect detection platform 100 in the example embodiment illustrated in FIG. 2 is mounted above railway track 210 and directs laser beam 212 of laser Doppler vibrometer 110 down toward the top of railway track 210, in other embodiments, a railway track defect detection platform that uses laser Doppler may be mounted on the side of a mobile platform that travels along railway track 210 such that a laser beam can be directed horizontally to a surface on the side of railway track 210. In general, a railway track defect detection platform that uses laser Doppler may be mounted to a mobile platform that travels along railway track 210 at any position and/or orientation, and a laser beam from any of one or more laser Doppler vibrometers of the platform may be directed to the railway track at any arbitrary angle, or at multiple angles, to collect vibration data.

The mobile railway track defect detection platform 100 in the example embodiment illustrated in FIG. 2 uses wheels 220 as a natural excitation source to excite the railway track. This force can be an impact force if there is discontinuity in the interaction of the wheel(s) and the top surface of the railway tracks. However, this will not be a controlled impact force. If the surfaces of railway tracks are very good, the natural excitation of the railway tracks by railway vehicle wheels may not be an impact excitation. In some embodiments, the force excited by the wheels (i.e., the impact force applied by the wheels to the railway track) may be measured by accelerometers placed on the wheels and this information may serve as an input to the modal parameter analyzer. Other excitation mechanisms may be used instead of, or in addition to, wheels on the mobile railway track defect detection platform. In one example, the system may include a wheel moving vertically in a harmonic pattern to create a continuous harmonic force. In another example, the system may include an automatic impact hammer to create a controlled impact excitation. An excitation system that includes an external excitation system or in which the forces applied by the wheels of a railway vehicle are measured may be considered an input-output system. In some embodiments, it might not be necessary to measure the excitation force in order to detect railway track defects.

Figure 3:
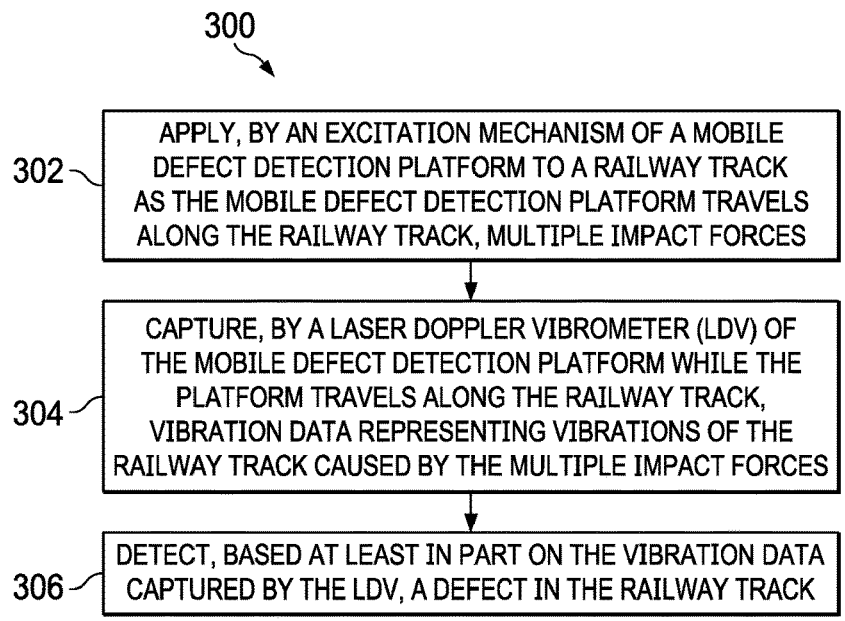
FIG. 3 is a flow diagram illustrating selected elements of an example method for detecting defects in railway tracks, according to at least one embodiment.

FIG. 3 is a flow diagram illustrating selected elements of an example method 300 for detecting defects in railway tracks, according to at least one embodiment. It is noted that some of the operations of method 300, as depicted in FIG. 3, may be optional. In various embodiments, method 300 may start or stop at any operation, and one or more of the operations of method 300 may be repeated and/or may be performed in a different order than the order depicted in FIG. 3.

As illustrated at 302, method 300 may include applying, by an excitation mechanism of a mobile defect detection platform to a railway track as the mobile defect detection platform travels along the railway track, multiple impact forces. The excitation mechanism may include an impact hammer, multiple wheels of the platform, or any other mechanical element of the platform suitable for applying a series of impact forces to the railway track as the platform travels along the railway track.

Method 300 may also include, at 304, capturing, by a laser Doppler vibrometer (LDV) of the mobile defect detection platform while the platform travels along the railway track, vibration data representing vibrations of the railway track caused by the multiple impact forces. For example, the laser Doppler vibrometer may be configured to sample laser beams reflected off the railway track at a predetermined constant frequency, the predetermined constant frequency being dependent on the vibration frequency of the railway track. At least a portion of the recorded and/or sampled vibration data may be provided to a modal parameter analyzer.

At 306, the method may include detecting, based at least in part on the vibration data captured by the LDV, a defect in the railway track. For example, a modal parameter analyzer may be configured to determine a value of a modal parameter for each of multiple vibration data samples obtained by laser Doppler vibrometer(s) 110 and to detect a change in the value of the modal parameter indicative of a defect in the railway track. The modal parameter analyzer may be configured to determine, based on received vibration data, that vibration amplitudes, mode shapes, damping ratios, or a natural frequency derived from the received vibration data are indicative of the presence of a defect in the railway track.

In at least some embodiments, all or a portion of method 300 may be implemented by circuitry within a mobile railway track defect detection system or by program instructions executed by a processor with a mobile railway track defect detection system.

Figure 4:
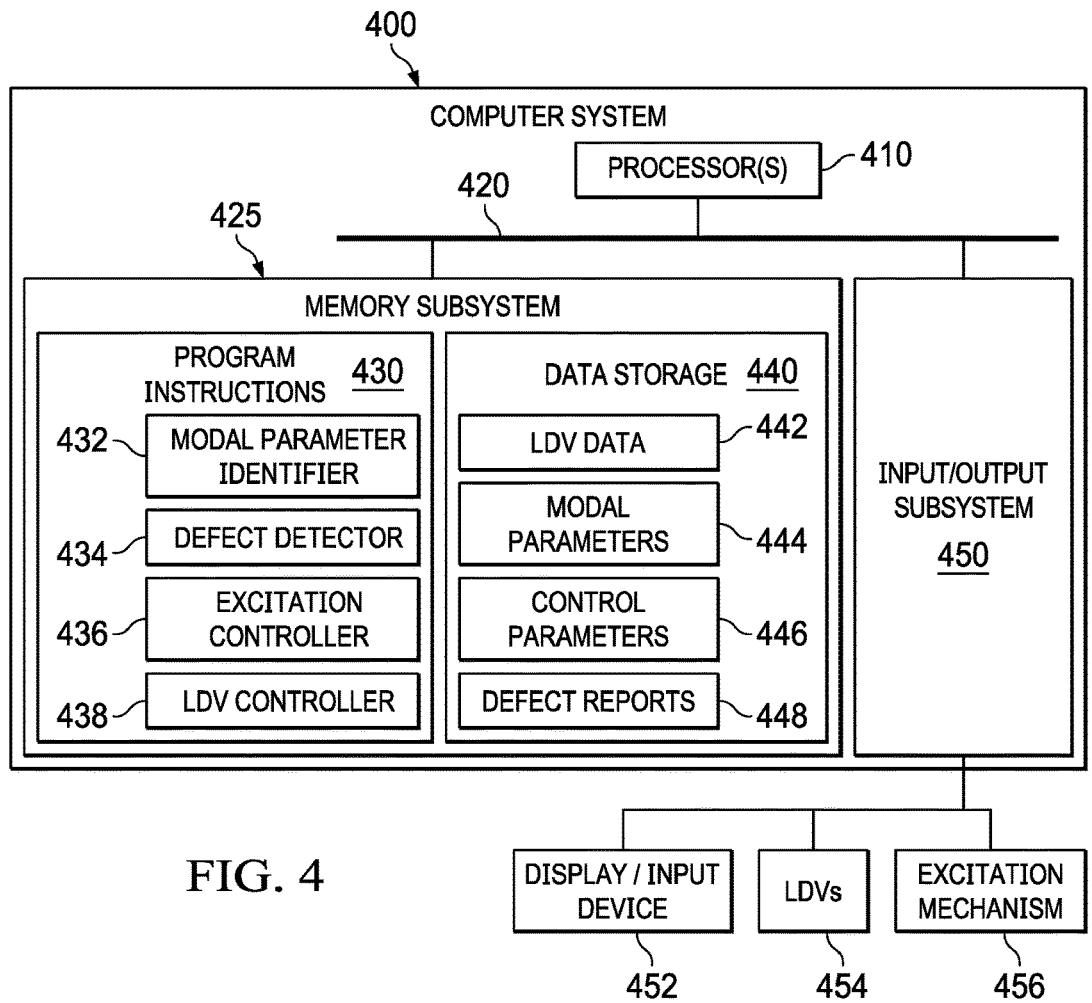
FIG. 4 is a block diagram illustrating selected elements of a computer system used in railway track defect detection, according to one embodiment.

FIG. 4 is a block diagram illustrating selected elements of a computer system 400 used in mobile railway track defect detection, according to one embodiment. In various embodiments, computer system 400 may implement the functionality of system controller 130 and/or modal parameter analyzer 140 illustrated in FIG. 1 and described above, or any subset of the functionality of system controller 130 and/or modal parameter analyzer 140. In some embodiments, the functionality of system controller 130 and/or modal parameter analyzer 140 may be distributed among multiple controllers or analyzers, some of which reside on a mobile railway track defect detection platform and others of which are communicatively coupled to a mobile railway track defect detection platform but reside output of the platform itself. For example, respective portions of the functionality of system controller 130 may be implemented by an excitation controller and an LDV controller. In another example, respective portions of the functionality of modal parameter analyzer 140 may be implemented by a modal parameter identifier and a defect detector. In some embodiments, computer system 400 may include a desktop or mainframe computer. In some embodiments, computer system 400 may include a portable device such as a laptop computer, notebook computer, media player, personal data assistant, digital camera, cellular phone, cordless phone, smart phones, tablet computer, or 2-in-1 tablet-laptop combination computer.

As illustrated in FIG. 4, computer system 400 may include one or more processors 410, a memory subsystem 425, and an input/output subsystem 450 coupled to each other through interface 420. Input/output subsystem 450 may couple computer system 400 to a display device 452, one or more laser Doppler vibrometers, and/or an excitation mechanism 456. Each of processors 410 may include circuitry or logic to interpret or execute program instructions and/or to process data. For example, each processor 410 may include a microprocessor, microcontroller, digital signal processor (DSP), graphics processor, or application specific integrated circuit (ASIC). In some embodiments, processors 410 may interpret and/or execute program instructions and/or process data stored locally in memory subsystem 425 or remotely (not shown).

Processors 410 may implement any instruction set architecture (ISA), in different embodiments. In some embodiments, all of the processors 410 may implement the same ISA. In other embodiments, two or more of processors 410 may implement different ISAs. Processors 410 are coupled to a memory subsystem 425 and an input/output subsystem 450 via a system interface 420. System interface 420 may implement any of a variety of suitable bus architectures and protocols including, but not limited to, a Micro Channel Architecture (MCA) bus, Industry Standard Architecture (ISA) bus, Enhanced ISA (EISA) bus, Peripheral Component Interconnect (PCI) bus, PCI-Express bus, or a Hyper-Transport (HT) bus.

In some embodiments, memory subsystem 425 may include random access memory (RAM), read-only memory (ROM), electrically erasable programmable read-only memory (EEPROM), flash memory, magnetic storage, opto-magnetic storage, and/or any other type of volatile or non-volatile memory. In some embodiments, memory subsystem 425 may include computer-readable media, e.g., a hard disk drive, floppy disk drive, CD-ROM, and/or other type of rotating storage media, and/or another type of solid state storage media. Memory subsystem 425 includes program instructions 430 and data storage 440.

In the example embodiment illustrated in FIG. 4, memory subsystem 425 includes program instructions 430, including program instructions that when executed by one or more of the processors 410 implement some or all of the methods described herein for detecting internal defects in railway tracks using mobile laser sensors. For example, program instructions 430 may include any or all of a modal parameter identifier 432, a defect detector 434, an excitation mechanism controller 436 to control the frequency or magnitude of impact forces applied to the railway track, or a laser Doppler vibrometer (LDV) controller 438 to control the operations of the LDC (including the frequency at which it samples vibration data). In the example embodiment illustrated in FIG. 4, data storage 440 may include storage for vibration data captured by an LDV (shown as LDV data 442), modal parameters 444 derived from the captured vibration data, control parameters 446 (which may include a speed control parameter value or a sampling frequency value), or one or more defect reports 448 indicating locations of defects detected in railway tracks. In some embodiments, a modal parameter analyzer may process some or all of the vibration data received from LDVs 454 as it is received (i.e., in real time). In some embodiments, at least some of the vibration data received from LDVs 454 may be stored as LDV data 442 for post-processing by a modal parameter analyzer at a later time.

In the example embodiment illustrated in FIG. 4, input/output subsystem 450 may implement any of a variety of digital and/or analog communication interfaces, graphics interfaces, video interfaces, user input interfaces, and/or peripheral interfaces for communicatively coupling input/output devices or other remote devices to the components of computing system 400. Input/output subsystem 450 may generate signals to be provided (e.g., via one or more output pins of computing system 400) to one or more LDVs 454 and/or excitation mechanism 456. For example, input/output subsystem may provide a control signal to LDVs 454 indicating a sampling frequency to be used when collecting vibration data or may provide a control signal to excitation mechanism 456 indicating a frequency at which impact forces are to be applied to a railway track during an exercise to collect vibration data (e.g., a speed at which a mobile defect detection platform is to travel along the railway track.)

Input/output subsystem 450 may receive (e.g., via one or more input pins of computing system 400) signals from LDVs 454 and/or excitation mechanism 456. For example, input/output subsystem may receive vibration data from LDVs 454. Input/output subsystem 450 may also generate signals to be provided (e.g., via one or more output pins of computing system 400) to a display/input device 452. Display/input device 452 may receive signals encoding data for display of a graphical user interface (GUI) or command line interface for interacting with various components of a mobile railway track defect detection system. For example, any of controls 152 shown in FIG. 1 may be received through a GUI or command line of display/input device 452.

The feasibility of implementing systems and methods for detecting internal cracks in railway tracks using moving laser sensors has been investigated using two experimental test setups. Experiments performed using these test setups indicated that internal cracks in railway tracks can be detected based on modal parameters obtained by vibration sensors and that the data obtained by a mobile laser Doppler vibrometer can be sufficiently processed to detect such internal cracks.

In the experiments described below, vibration data was collected for the un-damaged and damaged states of a railway track by accelerometers in full contact with the track and by a non-contact Laser Doppler Vibrometer (LDV). Damaged states were created gradually by cutting cracks into the railway track having lengths of 10% and 20% of the cross section of the railway track head. Internal cracks reach their rapid propagation states after their sizes exceed 10-20% of the cross section of track heads. Therefore, it is desirable to detect cracks before they reach their rapid propagation states. Results of these experiments showed that differences occurred in modal parameters when the railway track was damaged that are detectable using accelerometers placed on the railway track. These changes in modal parameters may also be detected by LDV's placed on railway vehicles, which may facilitate the detection of internal cracks in railway tracks in the field. When an LDV is moved, speckle noise may corrupt data, especially if the surfaces of the measurement points are very rough, like the surfaces of railway tracks. Therefore, tests were also conducted to examine the suitability of a moving LDV for modal parameter identification and defect detection for railway tracks. These experiments have shown that damage detection of railway tracks may be performed using modal parameters obtained by moving LDV's. Note that in some embodiments of the present disclosure, mirrors may be used to keep the laser beam stationary for very short time segments in order to avoid speckle noise and better capture the vibration behavior of the railway tracks.

In the first test setup, the effect of an internal crack on modal parameters of a railway track was investigated. Because it was not possible, in this experiment, to introduce damage inside of the railway track head, 10% and 20% of the cross section of track head was cut instead. More specifically, the track was damaged at its mid-point by gradually cutting 10% and 20% of the cross section of track head with thickness of 1 mm. Results of the experiments conducted using the first test setup demonstrated that detectable changes occurred in mode shapes and damping ratios of the test track as the damage was introduced gradually. Using the second test setup, an LDV was moved using a moving platform, and the reliability of recording vibration data from the rough-unreflective surface of railway track was examined. As noted above, speckle noise causes sharp peaks in data when the data is recorded by a moving LVD. Modal parameters identified by using the moving LDV were compared with the those identified by using three accelerometers. The results of this comparison showed that reliable system identification (and, consequently, detection of internal railway track defects) is possible using a moving LDV.

In the first test setup, vibration data was recorded by stationary accelerometers and a stationary LDV. This setup was used to investigate the effect of internal crack type damage on the dynamic properties of a railway track. In this test setup, a railway track of length of 106 cm was placed between two relatively large steel beams, and C-clamps were used as boundary conditions representing railway fasteners. Vertical and horizontal vibration measurements were taken with the aim of investigating both vertical and horizontal modes, as shown in FIGS. 5A-5D.

Figure 5A:
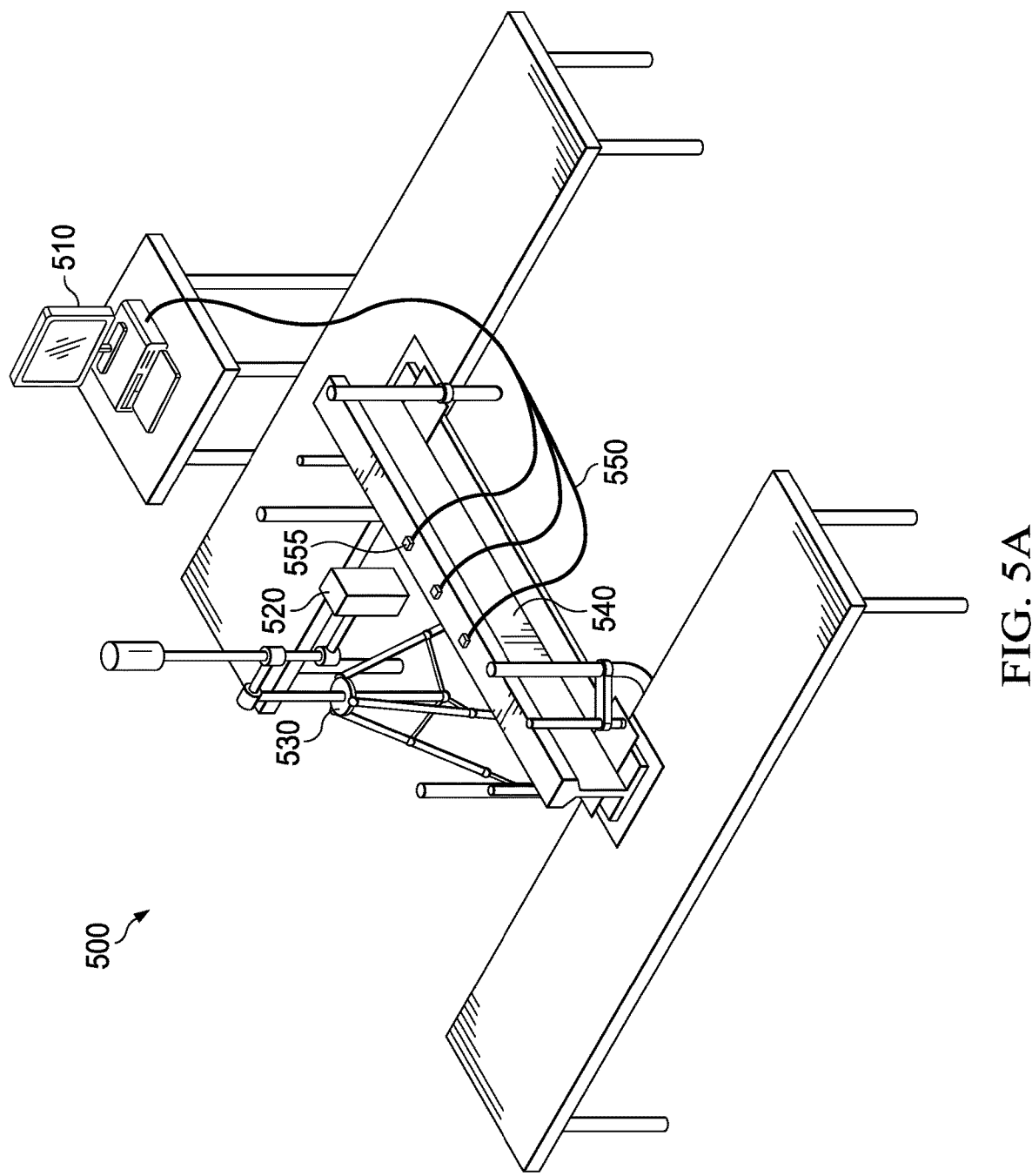
FIGS. 5A-5D illustrate a first experimental test setup for determining the feasibility of using mobile laser Doppler vibrometers for railway track defect detection.
Figure 5B:
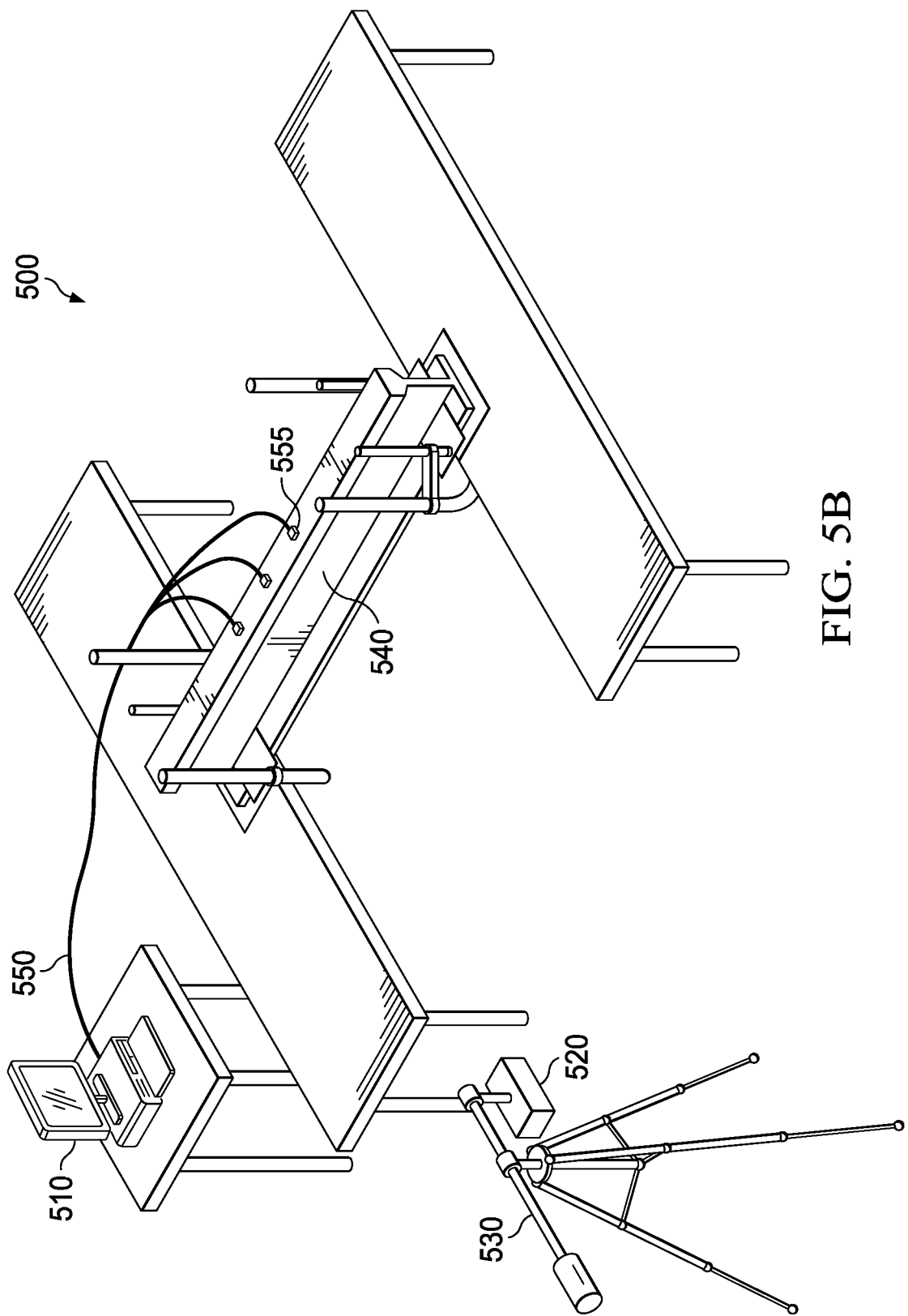
Figure 5C:
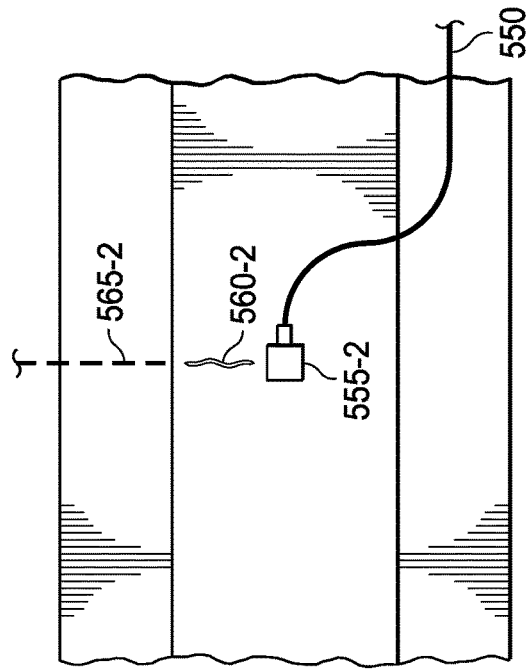
Figure 5D:
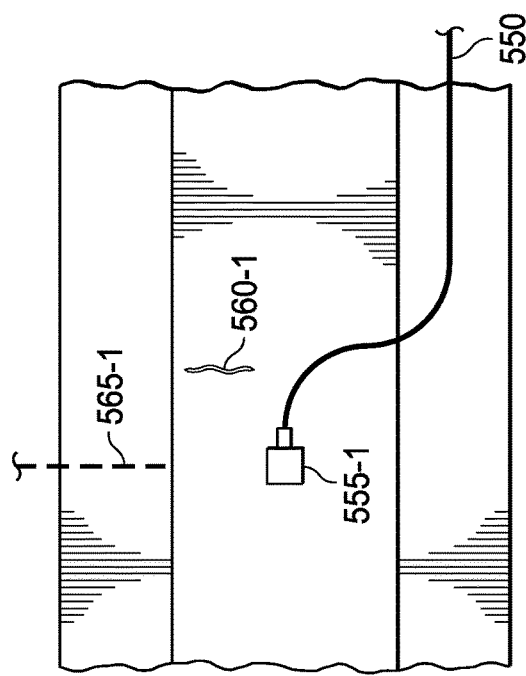

FIGS. 5A-5D illustrate the use of the first experimental test setup 500 for determining the feasibility of using mobile laser Doppler vibrometers for railway track defect detection. More specifically, FIG. 5A illustrates the experimental setup and the recording of vertical vibration measurements, while FIG. 5B illustrates the experimental setup and the recording of horizontal vibration measurements. As illustrated in these figures, the first experimental test setup includes a laptop 510 at which data collection, visualization and/or analysis is performed, a stationary LDV 520 mounted on an LDV stand 530 in a fixed position, a portion of a railway track 540, and multiple accelerometers 555 coupled to laptop 510 via cabling 550. Laptop 510 may include any or all of the elements of computer system 400 illustrated in FIG. 4 and may be configured to perform any of the methods described herein including, but not limited to, method 300 illustrated in FIG. 3. FIG. 5C illustrates the railway track damage 560-1 and the recording of vibration measurements by an LDV from point A2 shown in FIG. 6. In this figure, the impact point for the excitation of the portion of the railway track is shown as 565-1 and an accelerometer 555-1 located a short distance from the damaged point 560-1 is coupled to a data collection, visualization and/or analysis component (such as laptop 510) via cabling 550. FIG. 5D illustrates the railway track damage 560-2 and the recording of vibration measurements by an LDV from point A3 shown in FIG. 6. In this figure, the impact point for the excitation of the portion of the railway track is shown as 565-2 and an accelerometer 555-2 that is horizontally aligned with damaged point 560-2 is coupled to a data collection, visualization and/or analysis component (such as laptop 510) via cabling 550.

Figure 6:
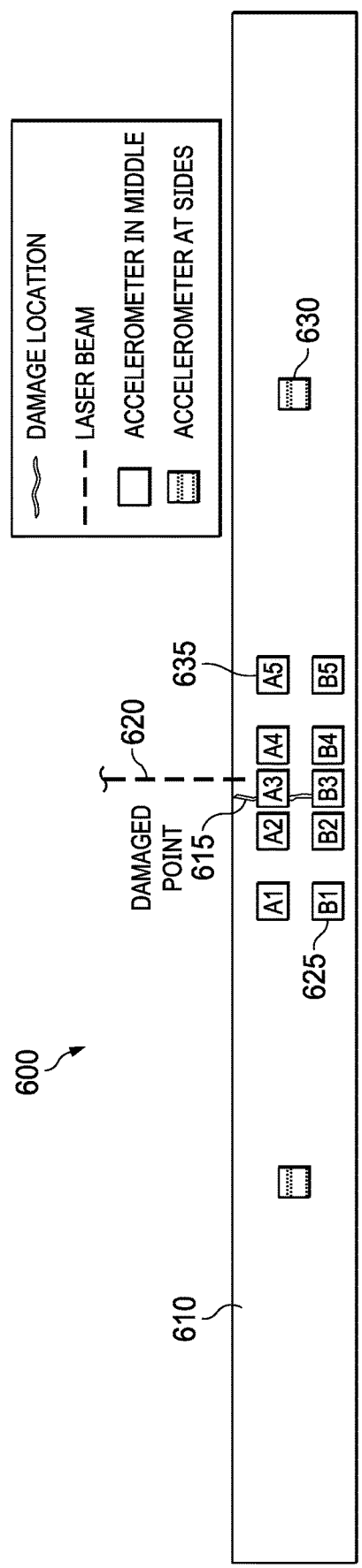
FIG. 6 is a block diagram illustrating an example instrumentation configuration for the test setup shown in FIGS. 5A-5D.

FIG. 6 is a block diagram illustrating an example instrumentation configuration 600, including the position of the accelerometers and the measurement point of the LDV, for test setup 500 shown in FIGS. 5A-5D. Two of the accelerometers, including accelerometer 630, were located at quarter points of track 610 while one of the accelerometers, shown as accelerometer 635 was placed at the mid-point of the track. In addition, the location of accelerometer 635 was changed to several positions near the crack (shown as damaged point 615), including at point 625 (B1). These locations were called as A1, A2, A3, A4, A5, B1, B2, B3, B4, B5. The first five positions were located on 'line A' whereas other five positions were located on 'line B'. Note that 'line A' was in line with damage point 615, whereas 'line B' was not. This configuration facilitated an investigation into the differences in identified modal parameters obtained by using measurements taken over the damaged point (in line A) and close to the damaged point (in line B). In addition, the LDV was placed in a stationary configuration to record data from the mid-point of railway track 610 so that the results obtained from stationary LDV could be compared with accelerometers. In this experiment, the excitation of the track was performed by an impact hammer.

Figure 7A:
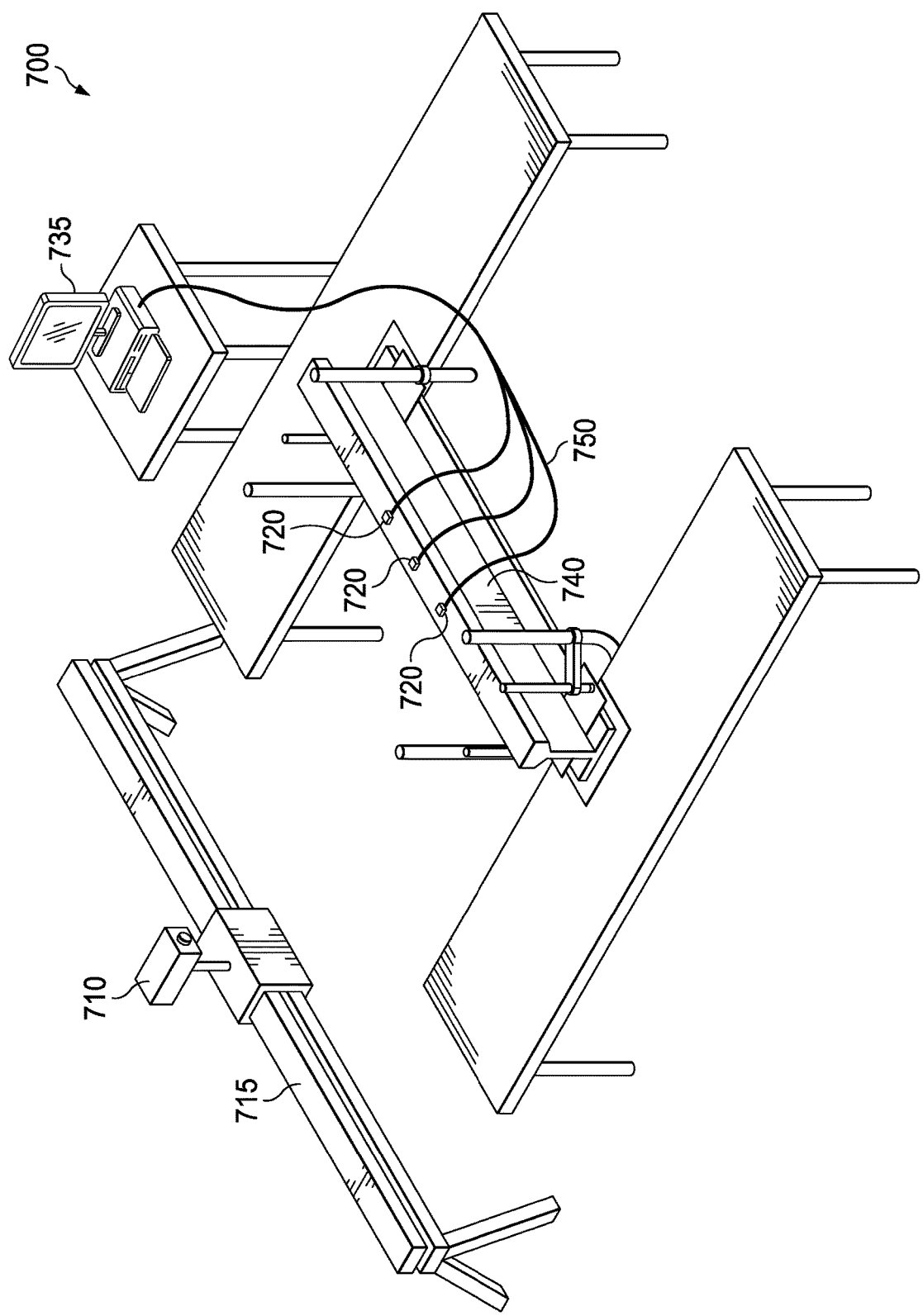
FIGS. 7A and 7B illustrate a second experimental test setup for determining the feasibility of using mobile laser Doppler vibrometers for railway track defect detection.
Figure 7B:
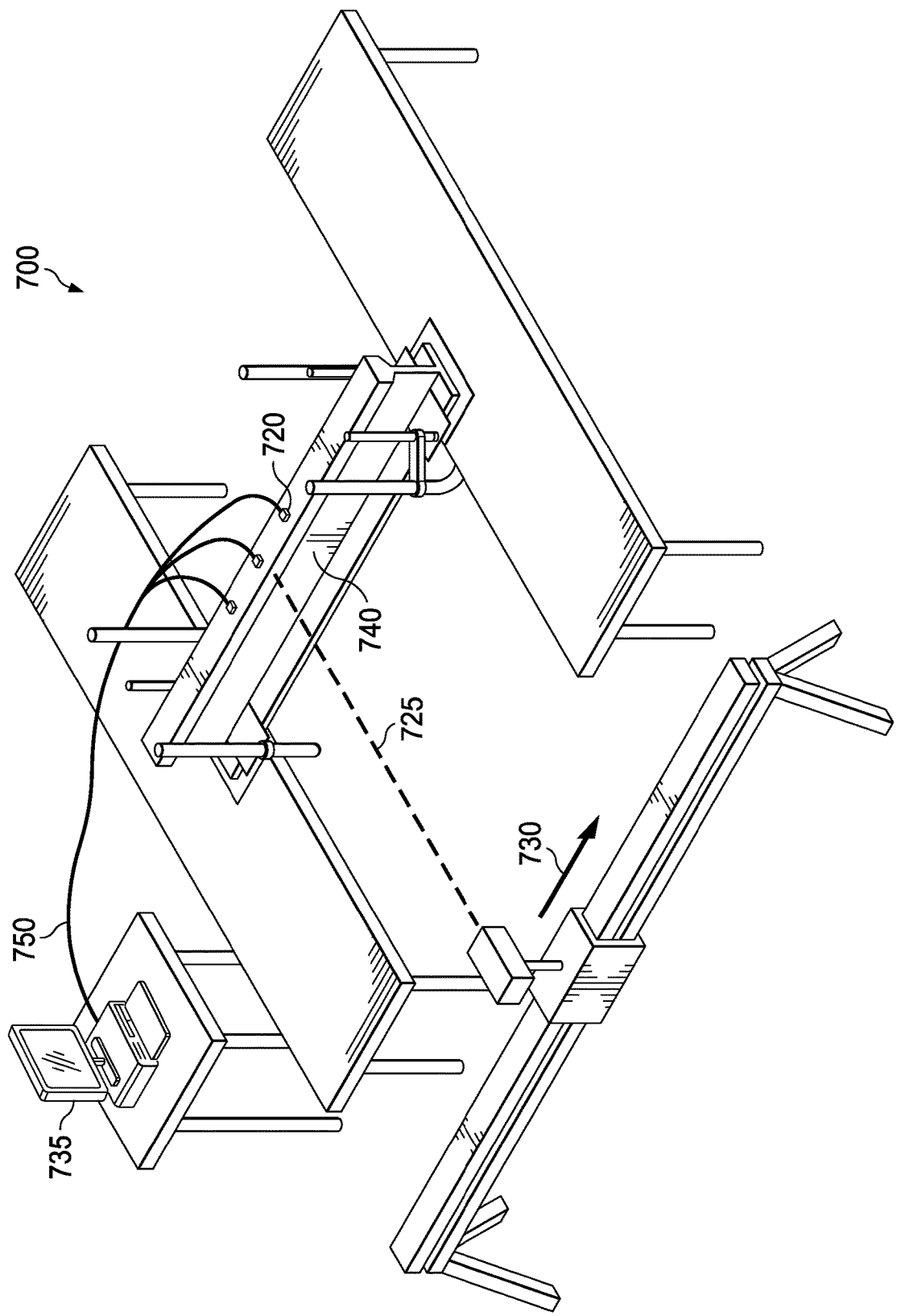

In the second test setup, vibration data was recorded by stationary accelerometers and a moving LDV. FIGS. 7A and 7B illustrate the use of the second experimental test setup 700 for determining the feasibility of using mobile laser Doppler vibrometers for railway track defect detection. More specifically, FIG. 7A illustrates the second test setup and FIG. 7B illustrates the direction of movement 730 of LDV 710. This setup was used to investigate the efficiency of recording vibration data by using a moving LDV 710. The configuration of test setup 700 was similar to that of test setup 500 illustrated in FIGS. 5A-5D. For example, C-clamps were used to provide boundary conditions and three accelerometers 720 were placed on the railway track 740 and were coupled to a data collection, visualization and/or analysis component (in this case, laptop 735) via cabling 750. However, instead of keeping LDV 710 stationary, LDV 710 was moved horizontally by using a moving laser platform 715, and the laser beam 725 was directed to the track head. In experiments conducted using test setup 700, the moving speed of LDV 710 was 0.2 m/s. Laptop 735 may include any or all of the elements of computer system 400 illustrated in FIG. 4 and may be configured to perform any of the methods described herein including, but not limited to, method 300 illustrated in FIG. 3.

A discussion of the results of experiments conducted using test setup 500 illustrated in FIGS. 5A-5D follows below. In these experiments, the Frequency Domain Decomposition (FDD) method was adopted for the identification of modal parameters. In this method, the cross-correlation matrix obtained from the data taken from different sensors was decomposed by singular value decomposition (SVD). The diagonal terms in an eigenvalue matrix give the modal values, whereas the modal vector gives the mode shapes. For the damping identification, the response of each mode in frequency domain was transformed back to the time domain to obtain the impulse response function.

The sampling frequency of the accelerometers was set to 3 kHz, which was the maximum sampling frequency of the accelerometers, whereas a higher sampling frequency of 10 kHz was used for the LDV. The preliminary measurements demonstrated that the first two horizontal modes were clearly identified and their frequencies were between 450 and 1500 Hz.

In these experiments, because it was not possible to obtain clear peaks in the power spectrum when the vertical vibrations of the track were processed, the identified horizontal modes were used to investigate the changes in modal parameters. The reason that it was not possible to obtain clear peaks in the power spectrum may be due to the fact that the track was stronger in the vertical axis, and the fact that vibrations of the track in this direction could not be excited well with the current test setup. However, FEM results demonstrated that the vertical mode shapes were more sensitive to internal crack type damage than horizontal mode shapes were. Therefore, the ability to detect changes in horizontal modes may be considered adequate to illustrate the potential of internal crack type damage detection of railway tracks by using modal vibrations.

FIGS. 8A and 8B depict graphs based on data recorded by an accelerometer in test setup 500 shown in FIGS. 5A-5D. More specifically, graph 810 in FIG. 8A illustrates the time domain data (acceleration data) taken from one of the accelerometers at the mid-point of the track. Graph 820 in FIG. 8B illustrates the power spectrum of the horizontal modes obtained by using accelerometers (i.e., the FDD results). Because the LDV could record data only from one point, only the first mode could be identified using LDV measurements. The frequency of the first horizontal mode identified using data obtained by the LDV was identical to the frequency of the first horizontal mode identified using data obtained by the accelerometers.

FIGS. 9A and 9B depict graphs of mode shapes based on data recorded by an accelerometer at location B3 (the exact center of track 610) in test setup 500 shown in FIGS. 5A-5D. More specifically, these figures illustrate the first and second mode shapes in the un-damaged and damaged cases identified using measurements taken on 'line B'. Mode shapes are particular shapes within which structures vibrate. The magnitude of each shape is dependent on the particular vibration mode, but does not correspond to acceleration, velocity, etc. In other words, while the shapes are considered to have magnitudes, the magnitudes are typically presented as "dimensionless values" or "unitless values" that are normalized to a value of 1. FIG. 9A illustrates the horizontal fundamental mode shapes with no damage, with damage level 1 (10% damage) and with damage level 2 (20% damage). The mode shapes demonstrated a clear increase at the damaged point (i.e., the mid-point of the track). FIG. 9B illustrates the horizontal second mode shapes with no damage, with damage level 1 (10% damage) and with damage level 2 (20% damage). Changes in the second mode shape at the damaged point were more pronounced than changes in the fundamental mode shape at the damaged point, indicating that higher modes may be more sensitive to damage (due to stiffness reduction, for example). There was no observable difference in the identified mode shapes obtained from measurements taken on 'line A' and the identified mode shapes obtained from measurements 'line B'. Therefore, results obtained by using measurements taken on 'line A' are not included. In these experiments, the frequencies of the track were insensitive to damage, as well.

Figure 10:
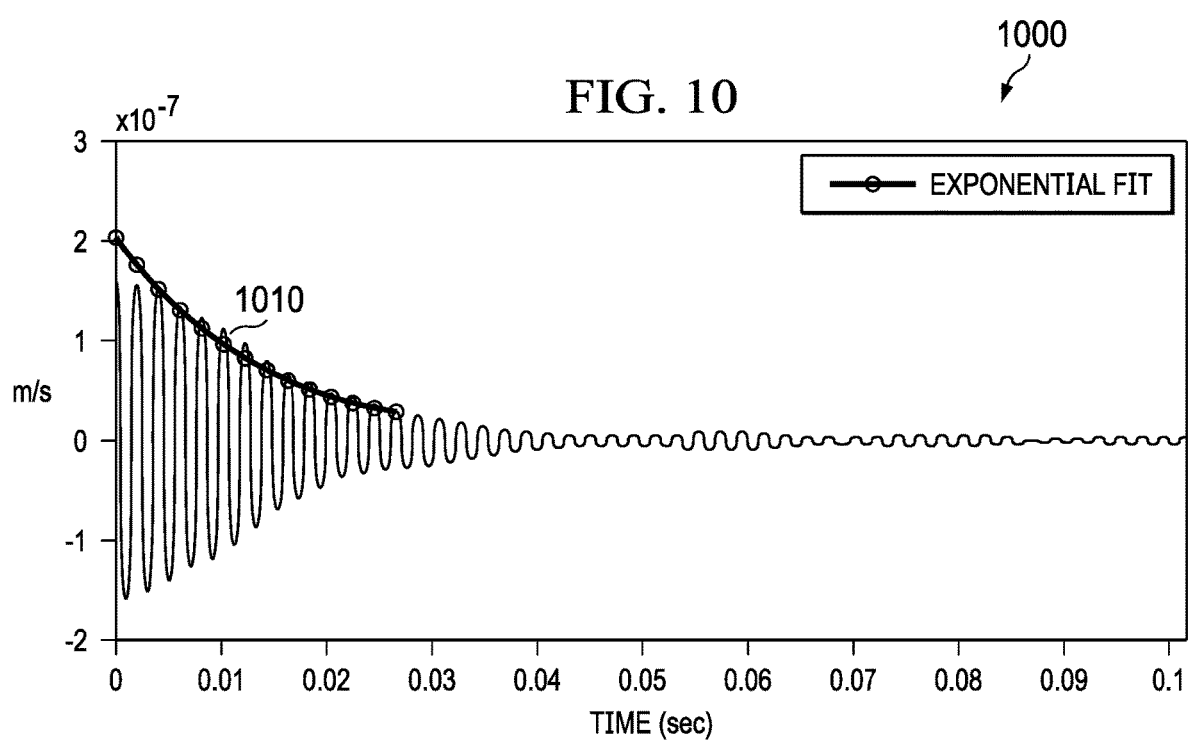
FIG. 10 illustrates an impulse response function of the fundamental mode in the test setup shown in FIGS. 5A-5D.

FIG. 10 illustrates an impulse response function of the fundamental horizontal mode in test setup 500 shown in FIGS. 5A-5D. More specifically, graph 1000 in FIG. 10 illustrates the impulse response of the first mode, in which the decay rate was related to the damping ratio. Shown in FIG. 10 is an exponential fit for data including data point 1010. Several measurements were taken for damping identification and their average values were used.

FIGS. 11A and 11B depict graphs of damping ratios based on data recorded by an accelerometer in test setup 500 shown in FIGS. 5A-5D. More specifically, graph 1110 in FIG. 11A illustrates the difference in the damping ratio of the fundamental mode with no damage (in the group of measurements labeled 1112), 10% damage (in the group of measurements labeled 1114), and 20% damage (in the group of measurements labeled 1116). Graph 1120 in FIG. 11B illustrates the difference in the damping ratio of the second mode with no damage (in the group of measurements labeled 1122), 10% damage (in the group of measurements labeled 1124), and 20% damage (in the group of measurements labeled 1126).

FIGS. 11A and 11B also illustrate the average values of the damping ratios. It is clear from these graphs that the average values of the damping ratios increased as the level of damage increased. Table 1 below illustrates the averaged damping ratio values of each damage case. The data shown in Table 1 also demonstrates the increase of the mode shape values at the mid-point of the track (the damaged point) compared to the undamaged case. In these experiments, a direct ratio of modal shape values at the mid-point was utilized to quantify the changes in mode shapes rather than Modal Assurance Criteria (MAC).

TABLE 1

Changes in mode shapes and damping ratios for different level of damages.

| Damage Case | Change in $1^{st}$ Mode Shape at Damaged Point | Change in $2^{nd}$ Mode Shape at Damaged Point | Average Damping of $1^{st}$ Mode | Average Damping of $2^{nd}$ Mode |
| --- | --- | --- | --- | --- |
| None | — | — | 2.10% | 1.70% |
| 10% | 2% | 8% | 2.19% | 1.72% |
| 20% | 5% | 100% | 2.32% | 1.80% |

A discussion of the results of experiments conducted using test setup 700 illustrated in FIGS. 7A and 7B follows below. In these experiments, the Frequency Domain Decomposition (FFD) approach was used to identify the modal properties based on data obtained from stationary accelerometers and the moving LDV.

Figure 12A:
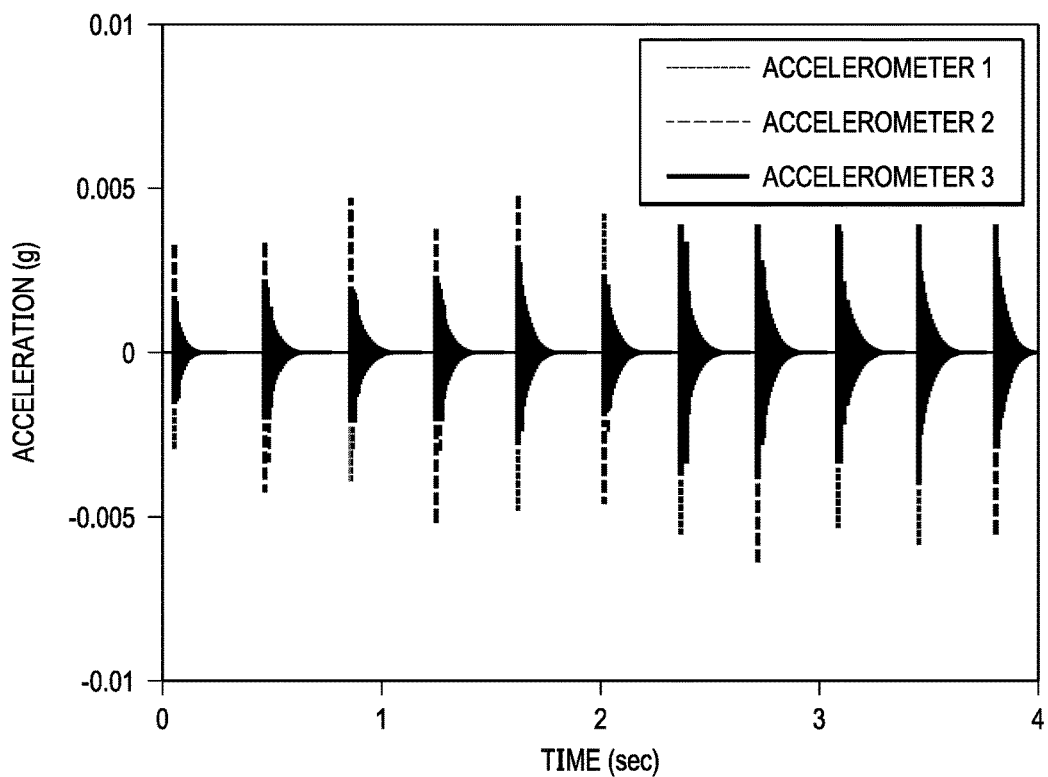
FIG. 12A is a graph of acceleration data recorded by stationary accelerometers.
Figure 12B:
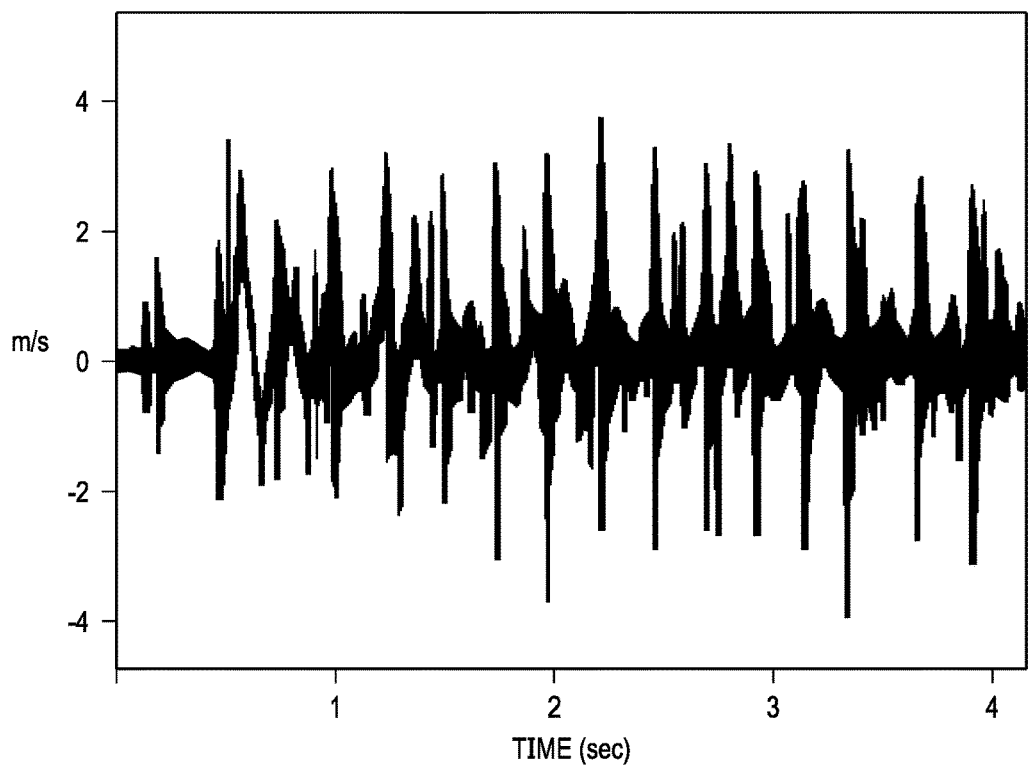
FIG. 12B is a graph of velocity data recorded by a moving laser Doppler vibrometer.

Graph 1210 in FIG. 12A illustrates the acceleration data recorded by the stationary accelerometers, which were placed horizontally. Graph 1220 in FIG. 12B illustrates the velocity data recorded by the horizontally moving laser Doppler vibrometer. As in test setup 500 illustrated in FIGS. 5A-5D, the excitation of the track was performed using an impact hammer. The location of excitations was at the mid-point of the track. In FIG. 12B, in addition to the peaks caused by impact forces, there were sharp peaks caused by speckle noise. However, these sharp peaks did not contaminate the considerable amount of data. The mean of the data also represented some oscillations, especially in the first part of the data. The cause of these oscillations was the vibration of the moving platform. However, when a bandpass filter was used around the frequencies of the modal modes of the track, a clean response of each mode was obtained. Graph 1230 in FIG. 12C illustrates responses of the first mode (e.g., velocity data) recorded by a moving laser Doppler vibrometer and then bandpass filtered around the frequencies of fundamental mode.

Figure 13A:
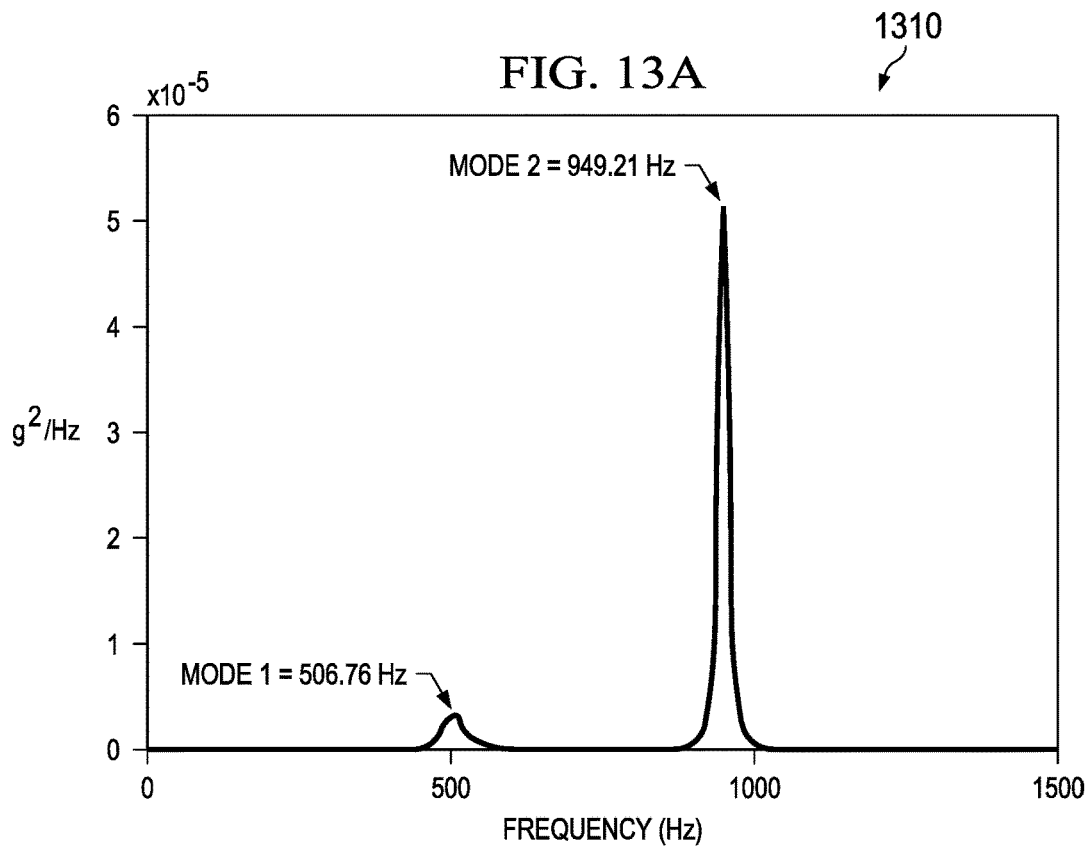
FIGS. 13A and 13B depict graphs of frequency domain decompositions based on data recorded by an accelerometer and by a moving laser Doppler vibrometer, respectively.
Figure 13B:
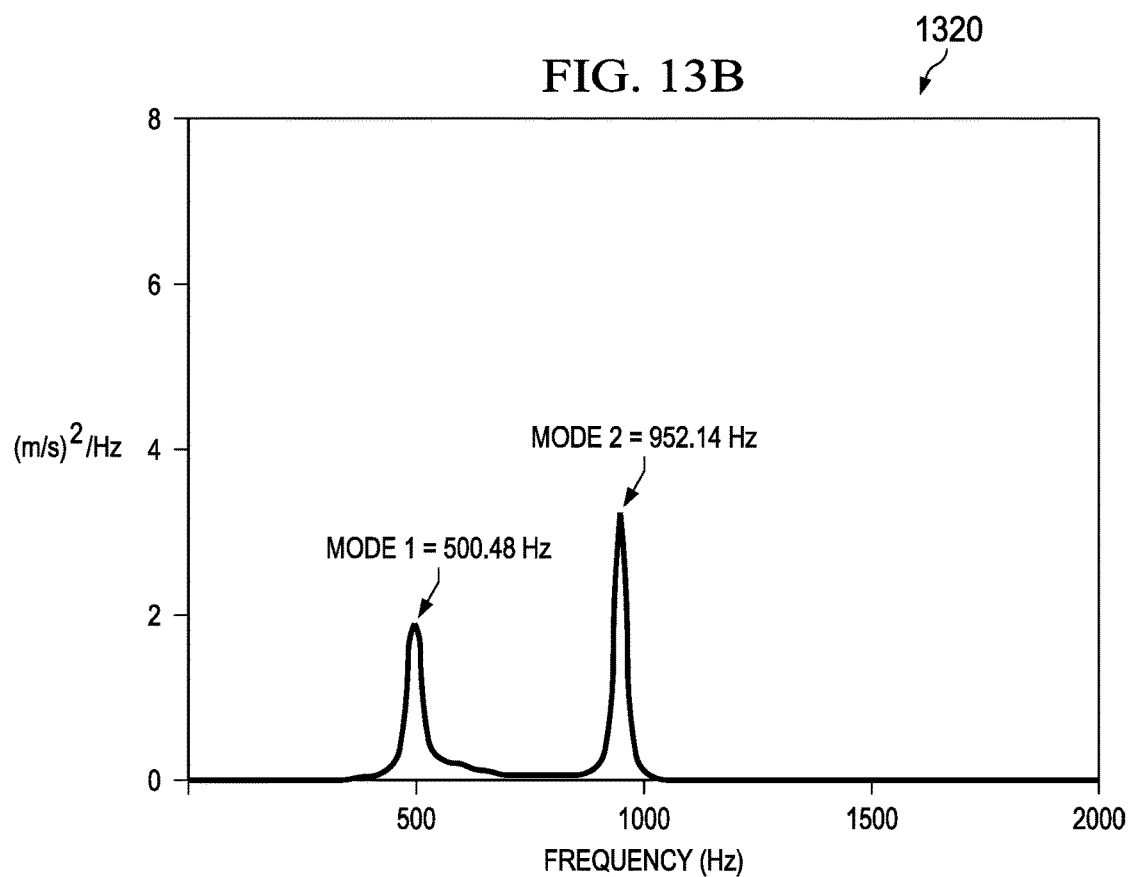

The first two modes of the second setup were 506 Hz, 949 Hz, respectively, and the damping ratios were 4.87% and 2.25%, respectively. These differences from the first setup were due to the reconstruction of the test setup such that the boundary conditions could not be kept constant. The identified frequencies and damping ratios obtained by using stationary accelerometers and the moving LVD were very similar, as seen in FIG. 13 and FIG. 14. It should be noted that no filters were used on the data recorded from the moving LDV to obtain these results. Graphs 1310 and 1320 in FIGS. 13A and 13B illustrate frequency domain decompositions based on data recorded by an accelerometer and by a moving laser Doppler vibrometer, respectively. Graphs 1410 and 1420 in FIGS. 14A and 14B illustrate impulse response functions in a first mode based on data recorded by an accelerometer and by a moving laser Doppler vibrometer, respectively. For example, shown in FIG. 14A is an exponential fit for data including data point 1415, and shown in FIG. 14B is an exponential fit for data including data point 1425.

Figure 15A:
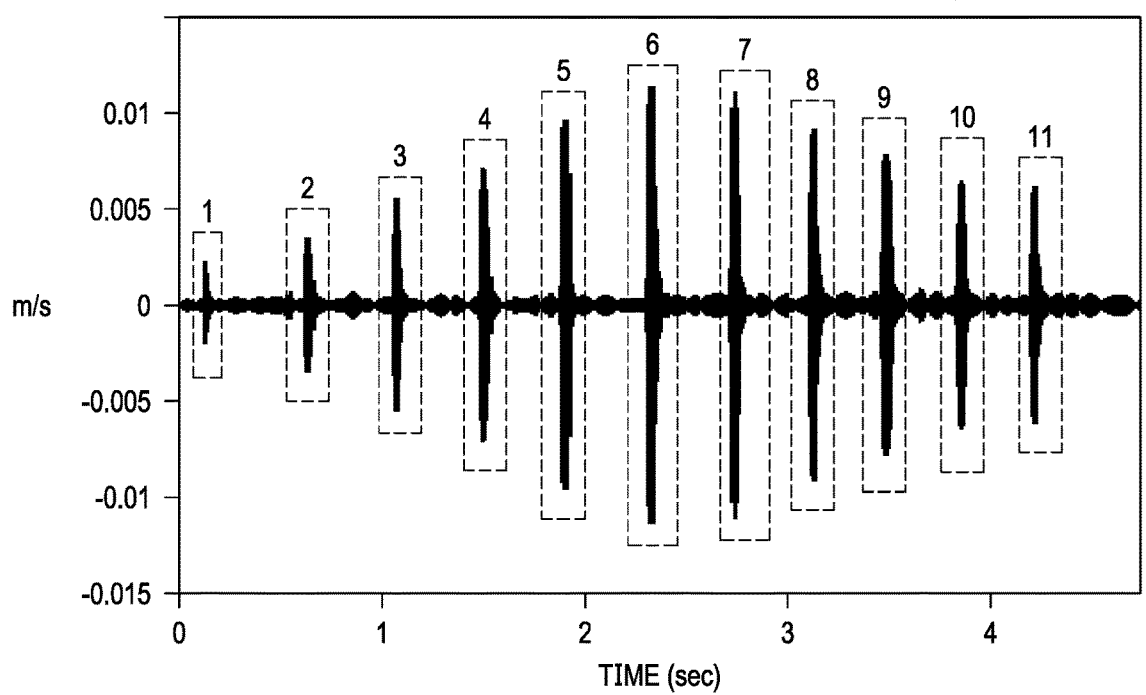
FIG. 15A is a graph of velocity data based on data recorded by a moving laser Doppler vibrometer.
Figure 15B:
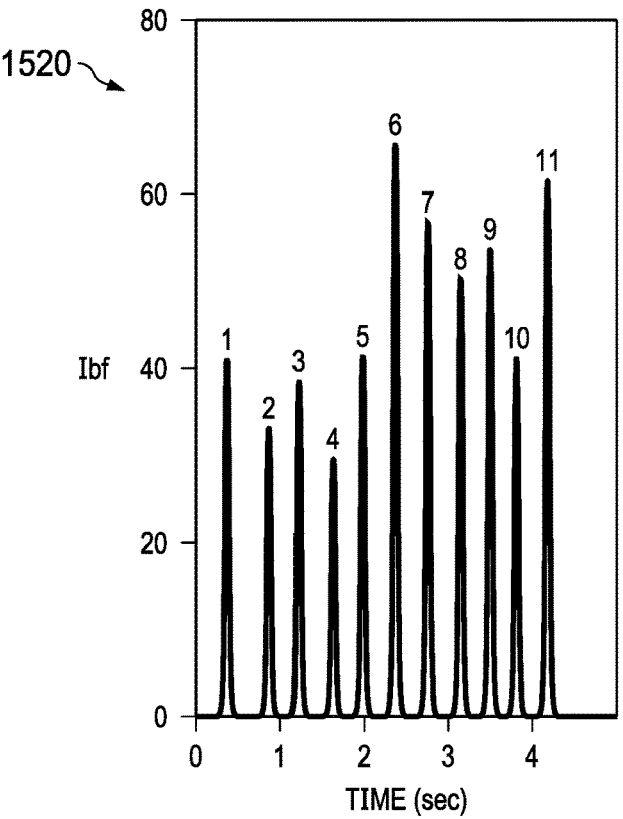
FIG. 15B is a graph of impact excitations over time.

In order to compare the mode shapes obtained by using the moving LDV and by the stationary accelerometers, the first mode response of the track was obtained using a bandpass filter on the data recorded by the moving LDV. This response was used to construct the first mode shape. The parts of the data that corresponded to the impact hammer excitations were considered as data recorded simultaneously at different sensors. As shown in FIG. 15, the data was divided into eleven segments, corresponding to the eleven excitations performed with the impact hammer. Graph 1510 in FIG. 15A illustrates the response of the first mode (e.g., velocity data) based on data recorded by a moving laser Doppler vibrometer and then bandpass filtered. In this example, the LDV was moving from one end of the railway track to the other end of the railway track, which took a little more than four seconds. During this movement, impact hammer excitation was applied. When a peak was present in the captured data, this represented a response that could be used to analyze the effectiveness of the disclosed railway track defect detection systems and techniques. In FIG. 15A, the first vertical box corresponds to a point at, or near, one end of the railway track, the second vertical box corresponds to a point next to the first point and so on. In FIG. 15, the data is plotted in the time domain (e.g., with time in seconds shown on the X axis), rather than in the spatial domain, to illustrate the fact that data from the time domain can be translated to the spatial domain when the approximate speed of the LDV is known. This is shown in FIG. 16, described below, in which data is plotted in the spatial domain (e.g., by location, as shown on the X axis). Graph 1520 in FIG. 15B illustrates the maximum values (force) of the impact hammer excitations over time.

In order to treat these segments as if they had been taken simultaneously, the magnitude of each segment was normalized based on the recorded amplitude of the impact hammer. Using this approach, the first mode shape, including 11 points, was obtained and the obtained mode shape was compared with the mode shape obtained using data from the three stationary accelerometers. Graph 1600 in FIG. 16 illustrates a comparison of a first mode shape based on data recorded by an accelerometer (in three positions associated with data points 1610, 1620, and 1630, respectively) and a first mode shape based on data recorded by a moving laser Doppler vibrometer. As in FIGS. 9A and 9B, the magnitudes of the shapes are presented as "dimensionless values" or "unitless values" that are normalized to a value of 1. However, it was not possible to use this approach to obtain second mode shapes because that phase of the second mode shape could be corrupted when the segmented data was not divided in a continuous way. An experiment involving the continuous excitation of the track could be performed so that the data can be divided into segments without losing phase information.

The results of the feasibility studies performed using test setup 500 and test setup 700 clearly demonstrated that a reduction in stiffness due to small internal crack in the railway track head is detectable by modal damping ratios and mode shapes. FEM results, which were not presented here for the sake of simplicity, were found to agree with these test results and supported the fact that the mode shapes of railway tracks are very susceptible to even small internal cracks in the railway track head. This study also demonstrated that reliable vibration data can be recorded from the rough surfaces of railway tracks using a moving LDV. These results support the fact that internal crack type damages in railway track heads can be detected using LDV's placed on railway vehicles.

The systems and methods described herein for detecting defects in railway tracks using mobile laser sensors have been shown to be suitable for identifying internal crack type defects in railway tracks. The use of these systems and methods may contribute to public safety, the efficiency of railway transportation and the economies of the regions in which they operate. In other embodiments, a mobile defect detection platform that includes one or more laser Doppler vibrometers may be used to detect other types of defects in railway tracks. In still other embodiments, a mobile defect detection platform that includes one or more laser Doppler vibrometers may be used to detect particular types of defects in target structures other than railway tracks while the mobile defect detection platform travels parallel to a face of the target structures.

Although only exemplary embodiments of the present disclosure are specifically described above, it will be appreciated that modifications and variations of these examples are possible without departing from the spirit and intended scope of the disclosure.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by the law, the scope of the present disclosure is to be determined by the broadest permissible interpretation of the following claims and their equivalents, and shall not be restricted or limited by the foregoing detailed description.

What is claimed is:

1. A system for detecting internal defects in railway tracks, comprising:
   a mobile defect detection platform, including:
   an excitation mechanism to apply multiple impact forces to a railway track while the mobile defect detection platform travels along a railway track;
   a first laser Doppler vibrometer to capture, while the mobile defect detection platform travels along the railway track, vibration data representing vibrations of the railway track caused by application of the multiple impact forces by the excitation mechanism at a first location relative to the excitation mechanism;
   a second laser Doppler vibrometer to capture, while the mobile defect detection platform travels along the railway track, vibration data representing vibrations of the railway track caused by application of the multiple impact forces by the excitation mechanism at a second location relative to the excitation mechanism; and
   a modal parameter analyzer to detect, based at least in part on the vibration data captured by the first laser Doppler vibrometer and the second laser Doppler vibrometer, P' an internal defect in the railway track.

2. The system of claim 1, wherein:
   the system further comprises an accelerometer coupled to the first laser Doppler vibrometer to measure the vibration of the first laser Doppler vibrometer while the mobile defect detection platform travels along the railway track and an accelerometer coupled to the second laser Doppler vibrometer to measure the vibration of the second laser Doppler vibrometer while the mobile defect detection platform travels along the railway track; and
   to detect the internal defect, the modal parameter analyzer is configured to subtract the vibration of the first laser Doppler vibrometer measured by the accelerometer from the vibration data captured by the first laser Doppler vibrometer and to subtract the vibration of the second laser Doppler vibrometer measured by the accelerometer from the vibration data captured by the second laser Doppler vibrometer.

3. The system of claim 1, wherein:
   the excitation mechanism comprises a plurality of wheels mounted on the mobile defect detection platform, the wheels being in contact with the railway track as the mobile defect detection platform travels along the railway track.

4. The system of claim 1, wherein to detect the internal defect, the modal parameter analyzer is configured to, for each of the multiple impact forces applied by the excitation mechanism:
   determine the magnitude of the impact force; and
   normalize the vibration data corresponding to the impact force based on the determined magnitude.

5. The system of claim 1, wherein to capture the vibration data, the first laser Doppler vibrometer and the second laser Doppler vibrometer are each configured to sample laser beams reflected off the railway track at a predetermined constant frequency, the predetermined constant frequency being dependent on the vibration frequency of the railway track.

6. The system of claim 5, wherein to detect the internal defect, the modal parameter analyzer is configured to:
   determine a value of a modal parameter for each of a plurality of vibration data samples; and
   detect a change in the value of the modal parameter indicative of an internal defect in the railway track.

7. The system of claim 1, wherein the modal parameter analyzer comprises:
   an input/output interface coupled to the first laser Doppler vibrometer and the second laser Doppler vibrometer to receive at least a portion of the vibration data captured by first laser Doppler vibrometer and the second laser Doppler vibrometer;
   a processor;
   a memory storing program instructions that when executed by the processor cause the processor to:
   determine, based on the received vibration data, that vibration amplitudes, mode shapes, damping ratios, or a natural frequency derived from the received vibration data are indicative of the presence of an internal defect in the railway track.

8. The system of claim 1, wherein the speed at which the mobile defect detection platform travels along the railway track is controlled by a predetermined speed parameter value, the predetermined speed parameter value being dependent on the vibration frequency of the railway track.

9. A od for detecting internal defects in railway tracks, comprising:
   applying, by an excitation mechanism of a mobile defect detection platform to a railway track as the mobile defect detection platform travels along the railway track, multiple impact forces;
   capturing, by at least two laser Doppler vibrometers of the mobile defect detection platform while the mobile detect detection platform travels along the railway track, vibration data representing vibrations of the railway track caused by application of the multiple impact forces by the excitation mechanism; and
   detecting, based at least in part on the vibration data captured by the at least two laser Doppler vibrometers, an internal defect in the railway track.

10. The method of claim 9, wherein:
    the method further comprises measuring, by an accelerometer coupled to each of the at least two laser Doppler vibrometers, the vibration of each of the laser Doppler vibrometers while the mobile defect detection platform travels along the railway track; and detecting the internal defect comprises subtracting the vibration of each of the laser Doppler vibrometers measured by the accelerometer from the vibration data captured by each of the laser Doppler vibrometers.

11. The method of claim 9, wherein:

the excitation mechanism comprises a plurality of wheels mounted on the mobile defect detection platform, the wheels being in contact with the railway track as the mobile defect detection platform travels along the railway track.

12. The method of claim 9, wherein detecting the internal defect comprises, for each of the multiple impact forces applied by the excitation mechanism:

determining the magnitude of the impact force; and normalizing the vibration data corresponding to the impact force based on the determined magnitude.

13. The method of claim 9, wherein capturing the vibration data comprises sampling laser beams reflected off the railway track at a predetermined constant frequency, the predetermined constant frequency being dependent on the vibration frequency of the railway track.

14. The method of claim 13, wherein detecting the defect comprises:

determining a value of a modal parameter for each of a plurality of vibration data samples; and detecting a change in the value of the modal parameter indicative of a defect in the railway track.

15. The method of claim 9, wherein the speed at which the mobile defect detection platform travels along the railway track is controlled by a predetermined speed parameter value, the predetermined speed parameter value being dependent on the vibration frequency of the railway track.

16. A mobile defect detection platform for detecting internal defects in a target structure, including:

an excitation mechanism to apply multiple impact forces to the target structure while the mobile defect detection platform travels parallel to a face of the target structure;

at least two laser Doppler vibrometers to capture, while the mobile defect detection platform travels parallel to the face of the target structure, vibration data representing vibrations of the target structure caused by application of the multiple impact forces by the excitation mechanism; and an input/output interface coupled to a modal parameter analyzer to communicate at least a portion of the vibration data captured by the at least two laser Doppler vibrometers to the modal parameter analyzer.

17. The mobile defect detection platform of claim 16, further comprising:

an accelerometer coupled to each of the at least two laser Doppler vibrometers to measure the vibration of each of the laser Doppler vibrometers while the mobile defect detection platform travels parallel to the face of the target structure.

18. The mobile defect detection platform of claim 16, wherein:

the excitation mechanism comprises a plurality of wheels mounted on the mobile defect detection platform, the wheels being in contact with the target structure as the mobile defect detection platform travels parallel to the face of the target structure.

19. The mobile defect detection platform of claim 16, wherein to capture the vibration data, each of the at least two laser Doppler vibrometers is configured to sample laser beams reflected off the face of the target structure at a predetermined constant frequency, the predetermined constant frequency being dependent on the vibration frequency of the target structure.

20. The mobile defect detection platform of claim 16, wherein the speed at which the mobile defect detection platform travels parallel to the face of the target structure is controlled by a predetermined speed parameter value, the predetermined speed parameter value being dependent on the vibration frequency of the target structure.

* * * * *

UNITED STATES PATENT AND TRADEMARK OFFICE
CERTIFICATE OF CORRECTION

PATENT NO. : 11,879,814 B2  
APPLICATION NO. : 16/647189  
DATED : January 23, 2024  
INVENTOR(S) : Korkut Kaynardag et al.

Page 1 of 1

It is certified that error appears in the above-identified patent and that said Letters Patent is hereby corrected as shown below:

In the Claims

In Column 17, Lines 50-51 Claim 1, "...Doppler vibrometer, P' an internal..." should read -- Doppler vibrometer, an internal --

In Column 18, Line 49 Claim 9, "A od for detecting..." should read -- A method for detecting --

Signed and Sealed this
Twenty-seventh Day of February, 2024

Katherine Kelly Vidal
*Director of the United States Patent and Trademark Office*